US012569942B2

(12) United States Patent
Vecchio et al.

(10) Patent No.: US 12,569,942 B2
(45) Date of Patent: Mar. 10, 2026

(54) IRON-BASED ALLOYS DESIGNED FOR WEAR AND CORROSION RESISTANCE

(71) Applicant: Oerlikon Metco (US) Inc., Wetbury, NY (US)

(72) Inventors: James Nathaniel Vecchio, San Diego, CA (US); Justin Lee Cheney, Encinitas, CA (US); Cameron Eibl, Encinitas, CA (US)

(73) Assignee: Oerlikon Metco (US) Inc., Westbury, NY (US)

( * ) Notice: Subject to any disclaimer, the term of this patent is extended or adjusted under 35 U.S.C. 154(b) by 712 days.

(21) Appl. No.: 17/625,319

(22) PCT Filed: Jul. 7, 2020

(86) PCT No.: PCT/US2020/041006
§ 371 (c)(1),
(2) Date: Jan. 6, 2022

(87) PCT Pub. No.: WO2021/007209
PCT Pub. Date: Jan. 14, 2021

(65) Prior Publication Data
US 2022/0258289 A1 Aug. 18, 2022

Related U.S. Application Data

(60) Provisional application No. 62/952,668, filed on Dec. 23, 2019, provisional application No. 62/872,105, filed on Jul. 9, 2019.

(51) Int. Cl.
*C22C 38/22* (2006.01)
*B23K 35/30* (2006.01)
(Continued)

(52) U.S. Cl.
CPC ............ *B23K 35/308* (2013.01); *C22C 38/22* (2013.01); *C22C 38/26* (2013.01); *C22C 38/28* (2013.01);
(Continued)

(58) Field of Classification Search
CPC .......... B22F 2009/0824; B22F 2999/00; B22F 9/082; C21D 2211/004; C21D 2211/005;
(Continued)

(56) References Cited

U.S. PATENT DOCUMENTS 2,043,952 A 6/1936 Ffield
2,156,306 A 5/1939 Rapatz
(Continued)

FOREIGN PATENT DOCUMENTS

AU A-3662/89 1/1990
CN 86102537 9/1987
(Continued)

OTHER PUBLICATIONS

Al-Aqeeli et al.: "Formation of an amorphous phase and its crystallization in the immiscible Nb—Zr system by mechanical alloying." Journal of Applied Physics 114, 153512, 2013.
(Continued)

*Primary Examiner* — Jie Yang
(74) *Attorney, Agent, or Firm* — Knobbe, Martens, Olson & Bear, LLP

(57) ABSTRACT

Disclosed herein are embodiments of alloys configured to form a coating with two contrasting physical behaviors: 1) reduced hardness with the end result of an easily machinable coating and 2) high abrasion resistance. Generally low hardness will result in low abrasion resistance. However, embodiments of the alloys described herein are able to maintain a low hardness while exhibiting higher abrasion resistance.

20 Claims, 7 Drawing Sheets

(51) Int. Cl.

| | |
|---|---|
| *C22C 38/26* | (2006.01) |
| *C22C 38/28* | (2006.01) |
| *C22C 38/32* | (2006.01) |
| *C23C 4/067* | (2016.01) |
| *C23C 4/134* | (2016.01) |

(52) U.S. Cl.
CPC .............. *C22C 38/32* (2013.01); *C23C 4/067* (2016.01); *C23C 4/134* (2016.01)

(58) Field of Classification Search
CPC ....... C23C 24/103; C23C 30/00; C23C 4/067; C23C 4/134; C22C 33/0285; C22C 33/0292; C22C 38/002; C22C 38/22; C22C 38/24; C22C 38/26; C22C 38/28; C22C 38/32
See application file for complete search history.

(56) References Cited

U.S. PATENT DOCUMENTS

| | | |
|---|---|---|
| 2,507,195 A | 5/1950 | Winearls |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,663,214 A | 5/1972 | Moore |
| 3,724,016 A | 4/1973 | Kumar et al. |
| 3,819,364 A | 6/1974 | Frehn |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,066,451 A | 1/1978 | Rudy |
| 4,110,514 A | 8/1978 | Nicholson |
| 4,214,145 A | 7/1980 | Zvanut et al. |
| 4,235,630 A | 11/1980 | Babu |
| 4,240,827 A | 12/1980 | Alhara |
| 4,255,709 A | 3/1981 | Zatsepium et al. |
| 4,277,108 A | 7/1981 | Wallace |
| 4,285,725 A | 8/1981 | Gysel |
| 4,297,135 A | 10/1981 | Giessen et al. |
| 4,318,733 A | 3/1982 | Ray et al. |
| 4,362,553 A | 12/1982 | Ray |
| 4,365,994 A | 12/1982 | Ray |
| 4,415,530 A | 11/1983 | Hunt |
| 4,419,130 A | 12/1983 | Slaughter |
| 4,576,653 A | 3/1986 | Ray |
| 4,596,282 A | 6/1986 | Maddy et al. |
| 4,606,977 A | 8/1986 | Dickson et al. |
| 4,635,701 A | 1/1987 | Sare et al. |
| 4,638,847 A | 1/1987 | Day |
| 4,639,576 A | 1/1987 | Shoemaker |
| 4,666,797 A | 5/1987 | Newman et al. |
| 4,673,550 A | 6/1987 | Dallaire et al. |
| 4,762,681 A | 8/1988 | Tassen et al. |
| 4,803,045 A | 2/1989 | Ohriner et al. |
| 4,806,394 A | 2/1989 | Steine |
| 4,818,307 A | 4/1989 | Mori et al. |
| 4,822,415 A | 4/1989 | Dorfman et al. |
| 4,888,153 A | 12/1989 | Yabuki |
| 4,919,728 A | 4/1990 | Kohl et al. |
| 4,943,488 A | 7/1990 | Sung et al. |
| 4,957,982 A | 9/1990 | Geddes |
| 4,966,626 A | 10/1990 | Fujiki et al. |
| 4,981,644 A | 1/1991 | Chang |

| | | |
|---|---|---|
| 5,094,812 A | 3/1992 | Dulmaine et al. |
| 5,252,149 A | 10/1993 | Dolman |
| 5,280,726 A | 1/1994 | Urbanic et al. |
| 5,306,358 A | 4/1994 | Lai et al. |
| 5,375,759 A | 12/1994 | Hiraishi et al. |
| 5,424,101 A | 6/1995 | Atkins |
| 5,495,837 A | 3/1996 | Mitsuhashi |
| 5,567,251 A | 10/1996 | Peker et al. |
| 5,570,636 A | 11/1996 | Lewis |
| 5,618,451 A | 4/1997 | Ni |
| 5,820,939 A | 10/1998 | Popoola et al. |
| 5,837,326 A | 11/1998 | Dallaire |
| 5,843,243 A | 12/1998 | Kawasaki et al. |
| 5,858,558 A | 1/1999 | Zhao et al. |
| 5,861,605 A | 1/1999 | Ogawa et al. |
| 5,907,017 A | 5/1999 | Ober et al. |
| 5,911,949 A | 6/1999 | Ninomiya et al. |
| 5,935,350 A | 8/1999 | Raghu et al. |
| 5,942,289 A | 8/1999 | Jackson |
| 5,976,704 A | 11/1999 | McCune |
| 5,988,302 A | 11/1999 | Sreshta et al. |
| 6,071,324 A | 6/2000 | Laul et al. |
| 6,117,493 A | 9/2000 | North |
| 6,171,222 B1 | 1/2001 | Lakeland et al. |
| 6,210,635 B1 | 4/2001 | Jackson et al. |
| 6,232,000 B1 | 5/2001 | Singh et al. |
| 6,238,843 B1 | 5/2001 | Ray |
| 6,306,524 B1 | 10/2001 | Spitsberg et al. |
| 6,326,582 B1 | 12/2001 | North |
| 6,331,688 B1 | 12/2001 | Hallén et al. |
| 6,332,936 B1 | 12/2001 | Hajaligo et al. |
| 6,375,895 B1 | 4/2002 | Daemen |
| 6,398,103 B2 | 6/2002 | Hasz et al. |
| 6,441,334 B1 | 8/2002 | Alda et al. |
| 6,582,126 B2 | 6/2003 | North |
| 6,608,286 B2 | 8/2003 | Jiang |
| 6,669,790 B1 | 12/2003 | Gundlach et al. |
| 6,689,234 B2 | 2/2004 | Branagan |
| 6,702,905 B1 | 3/2004 | Qiao et al. |
| 6,702,906 B2 | 3/2004 | Ogawa et al. |
| 6,750,430 B2 | 6/2004 | Kelly |
| 7,052,561 B2 | 5/2006 | Lu et al. |
| 7,219,727 B2 | 5/2007 | Slack et al. |
| 7,285,151 B2 | 10/2007 | Sjodin et al. |
| 7,361,411 B2 | 4/2008 | Daemen et al. |
| 7,491,910 B2 | 2/2009 | Kapoor et al. |
| 7,507,305 B2 | 3/2009 | Kawasaki et al. |
| 7,553,382 B2 | 6/2009 | Branagan et al. |
| 7,569,286 B2 | 8/2009 | Daemen et al. |
| 7,754,152 B2 | 7/2010 | Riebel et al. |
| 7,776,451 B2 | 8/2010 | Jiang et al. |
| 7,935,198 B2 | 5/2011 | Branagan et al. |
| 8,070,894 B2 | 12/2011 | Branagan |
| 8,097,095 B2 | 1/2012 | Branagan |
| 8,153,935 B2 | 4/2012 | Jang et al. |
| 8,187,529 B2 | 5/2012 | Powell |
| 8,187,725 B2 | 5/2012 | Kiser et al. |
| 8,268,453 B2 | 9/2012 | Dallaire |
| 8,474,541 B2 | 7/2013 | Branagan et al. |
| 8,562,759 B2 | 10/2013 | Cheney et al. |
| 8,562,760 B2 | 10/2013 | Cheney et al. |
| 8,640,941 B2 | 2/2014 | Cheney |
| 8,647,449 B2 | 2/2014 | Cheney et al. |
| 8,658,934 B2 | 2/2014 | Branagan et al. |
| 8,662,143 B1 | 3/2014 | Foster |
| 8,669,491 B2 | 3/2014 | Menon et al. |
| 8,702,835 B2 | 4/2014 | Yu et al. |
| 8,703,046 B2 | 4/2014 | Hanejko et al. |
| 8,704,134 B2 | 4/2014 | Branagan et al. |
| 8,777,090 B2 | 7/2014 | Miller et al. |
| 8,801,872 B2 | 8/2014 | Wright et al. |
| 8,808,471 B2 | 8/2014 | Wright et al. |
| 8,858,675 B2 | 10/2014 | Larsson |
| 8,870,997 B2 | 10/2014 | Klekovkin et al. |
| 8,901,022 B2 | 12/2014 | Francy et al. |
| 8,911,662 B2 | 12/2014 | Larsson |
| 8,920,938 B2 | 12/2014 | Hesse et al. |
| 8,961,869 B2 | 2/2015 | Kapoor et al. |
| 8,973,806 B2 | 3/2015 | Cheney |

(56) References Cited

U.S. PATENT DOCUMENTS

| | | | |
|---|---|---|---|
| 8,992,659 B2 | 3/2015 | Larsson et al. | |
| 9,051,635 B2 | 6/2015 | Jou | |
| 9,095,932 B2 | 8/2015 | Miller et al. | |
| 9,145,598 B2 | 9/2015 | Oshchepkov | |
| 9,174,293 B2 | 11/2015 | Meyer | |
| 9,193,011 B2 | 11/2015 | Mars et al. | |
| 9,233,419 B2 | 1/2016 | Gries | |
| 9,255,309 B2 | 2/2016 | Aimone | |
| 9,309,585 B2 | 4/2016 | Cheney et al. | |
| 9,314,848 B2 | 4/2016 | Larsson | |
| 9,340,855 B2 | 5/2016 | Schade et al. | |
| 9,394,591 B2 | 7/2016 | Deodeshmukh et al. | |
| 9,399,907 B2 | 7/2016 | Mo et al. | |
| 9,469,890 B2 | 10/2016 | Bengtsson | |
| 9,540,711 B2 | 1/2017 | Fifield | |
| 9,580,773 B2 | 2/2017 | Aimone et al. | |
| 9,631,262 B2 | 4/2017 | Wright et al. | |
| 9,724,786 B2 | 8/2017 | Postle et al. | |
| 9,725,793 B2 | 8/2017 | Aimone et al. | |
| 9,738,959 B2 | 8/2017 | Cheney et al. | |
| 9,745,648 B2 | 8/2017 | Olserius et al. | |
| 9,802,387 B2 | 10/2017 | Cheney | |
| 9,815,148 B2 | 11/2017 | Postle | |
| 9,816,164 B2 | 11/2017 | Larsson et al. | |
| 9,821,372 B2 | 11/2017 | Gries | |
| 9,834,829 B1 | 12/2017 | Aimone et al. | |
| 9,845,520 B2 | 12/2017 | Wright et al. | |
| 9,856,546 B2 | 1/2018 | Fischer et al. | |
| 9,869,132 B2 | 1/2018 | Wyble et al. | |
| 9,879,333 B2 | 1/2018 | Gerk et al. | |
| 9,908,816 B2 | 3/2018 | Champion et al. | |
| 9,914,987 B2 | 3/2018 | Snyder et al. | |
| 9,919,358 B2 | 3/2018 | Gries | |
| 9,951,413 B2 | 4/2018 | Billieres | |
| 9,957,590 B2 | 5/2018 | Mars et al. | |
| 9,957,592 B2 | 5/2018 | Aimone et al. | |
| 9,970,091 B2 | 5/2018 | Crook et al. | |
| 9,994,935 B2 | 6/2018 | Wolverton et al. | |
| 10,100,388 B2 | 10/2018 | Cheney | |
| 10,105,796 B2 | 10/2018 | Eibl | |
| 10,125,412 B2 | 11/2018 | Kaner et al. | |
| 10,173,290 B2 * | 1/2019 | Cheney | F04B 43/1292 |
| 10,252,919 B2 | 4/2019 | Billieres et al. | |
| 10,329,647 B2 | 6/2019 | Cheney | |
| RE47,529 E | 7/2019 | Johnson | |
| 10,351,921 B2 | 7/2019 | Snyder et al. | |
| 10,351,922 B2 | 7/2019 | Snyder et al. | |
| 10,351,938 B2 | 7/2019 | Schade et al. | |
| 10,358,699 B2 | 7/2019 | Srivastava et al. | |
| 10,358,701 B2 | 7/2019 | Reed et al. | |
| 10,370,740 B2 | 8/2019 | Reed et al. | |
| 10,384,313 B2 | 8/2019 | Persson | |
| 10,400,314 B2 | 9/2019 | Aimone et al. | |
| 10,458,006 B2 | 10/2019 | Bengtsson | |
| 10,465,267 B2 | 11/2019 | Cheney | |
| 10,465,268 B2 | 11/2019 | Bergman | |
| 10,465,269 B2 | 11/2019 | Cheney | |
| 10,471,503 B2 | 11/2019 | Wright et al. | |
| 10,513,758 B2 | 12/2019 | Mars | |
| 10,519,529 B2 | 12/2019 | Wright et al. | |
| 10,550,460 B2 | 2/2020 | Nilsson et al. | |
| 10,577,680 B2 | 3/2020 | Srivastava et al. | |
| 10,597,757 B2 | 3/2020 | Gong et al. | |
| 10,702,918 B2 | 7/2020 | Hu | |
| 10,702,924 B2 | 7/2020 | Szabo et al. | |
| 10,711,329 B2 | 7/2020 | Wright et al. | |
| 10,731,236 B2 | 8/2020 | Kaner et al. | |
| 10,745,782 B2 | 8/2020 | Wolverton et al. | |
| 10,851,444 B2 | 12/2020 | Vecchio et al. | |
| 10,851,565 B1 | 12/2020 | Krueger | |
| 10,872,682 B2 | 12/2020 | Reed et al. | |
| 10,934,608 B2 | 3/2021 | Gu | |
| 10,941,473 B2 | 3/2021 | Snyder | |
| 10,954,588 B2 | 3/2021 | Cheney | |
| 11,001,912 B2 | 5/2021 | Aimone et al. | |
| 11,033,998 B2 | 6/2021 | Kavanaugh et al. | |
| 11,085,102 B2 | 8/2021 | Cheney | |
| 11,111,912 B2 | 9/2021 | Cheney | |
| 11,114,226 B2 | 9/2021 | Jayaraman et al. | |
| 11,118,247 B2 | 9/2021 | Gong et al. | |
| 11,124,429 B2 | 9/2021 | Gore et al. | |
| 11,130,205 B2 | 9/2021 | Cheney | |
| 11,174,538 B2 | 11/2021 | Kaner et al. | |
| 11,261,506 B2 | 3/2022 | Xu et al. | |
| 11,279,996 B2 | 3/2022 | Cheney et al. | |
| 11,325,189 B2 | 5/2022 | Imano et al. | |
| 11,326,239 B2 | 5/2022 | Cao et al. | |
| 11,353,957 B2 | 6/2022 | Border | |
| 11,359,268 B2 | 6/2022 | Cao et al. | |
| 11,370,198 B2 | 6/2022 | Maroli et al. | |
| 11,389,872 B2 | 7/2022 | Stawovy et al. | |
| 2001/0019781 A1 | 9/2001 | Hasz | |
| 2002/0054972 A1 | 5/2002 | Charpentier et al. | |
| 2002/0060907 A1 | 5/2002 | Saccomanno | |
| 2002/0098298 A1 | 7/2002 | Bolton et al. | |
| 2002/0148533 A1 | 10/2002 | Kim et al. | |
| 2002/0159914 A1 | 10/2002 | Yeh | |
| 2003/0013171 A1 | 1/2003 | Yang et al. | |
| 2004/0001966 A1 | 1/2004 | Subramanian | |
| 2004/0062677 A1 | 4/2004 | Chabenat et al. | |
| 2004/0079742 A1 | 4/2004 | Kelly | |
| 2004/0115086 A1 | 6/2004 | Chabenat et al. | |
| 2004/0206726 A1 | 10/2004 | Daemen et al. | |
| 2005/0047952 A1 | 3/2005 | Coleman | |
| 2005/0109431 A1 | 5/2005 | Kernan et al. | |
| 2005/0139294 A1 | 6/2005 | Kim et al. | |
| 2005/0164016 A1 | 7/2005 | Branagan et al. | |
| 2006/0063020 A1 | 3/2006 | Barbezat | |
| 2006/0093752 A1 | 5/2006 | Darolia et al. | |
| 2006/0163217 A1 | 7/2006 | Jiang | |
| 2006/0191606 A1 | 8/2006 | Ogawa et al. | |
| 2006/0260583 A1 | 11/2006 | Abi-Akar et al. | |
| 2007/0026159 A1 | 2/2007 | Deem | |
| 2007/0029295 A1 | 2/2007 | Branagan | |
| 2007/0090167 A1 | 4/2007 | Arjakine et al. | |
| 2007/0125458 A1 | 6/2007 | Kawasaki et al. | |
| 2007/0187369 A1 | 8/2007 | Menon et al. | |
| 2007/0187458 A1 | 8/2007 | Menon et al. | |
| 2007/0219053 A1 | 9/2007 | Barufka et al. | |
| 2007/0253856 A1 | 11/2007 | Vecchio et al. | |
| 2007/0284018 A1 | 12/2007 | Hamano et al. | |
| 2008/0001115 A1 | 1/2008 | Qiao et al. | |
| 2008/0031769 A1 | 2/2008 | Yeh | |
| 2008/0083391 A1 | 4/2008 | Sawada | |
| 2008/0149397 A1 | 6/2008 | Overstreet | |
| 2008/0199684 A1 | 8/2008 | Apte et al. | |
| 2008/0241580 A1 | 10/2008 | Kiser et al. | |
| 2008/0241584 A1 | 10/2008 | Daemen et al. | |
| 2008/0246523 A1 | 10/2008 | Murakamo et al. | |
| 2008/0253918 A1 | 10/2008 | Liang | |
| 2009/0017328 A1 | 1/2009 | Katoh et al. | |
| 2009/0075057 A1 | 3/2009 | Kulkarni | |
| 2009/0075101 A1 | 3/2009 | Kulkarni et al. | |
| 2009/0123765 A1 | 5/2009 | Branagan | |
| 2009/0154183 A1 | 6/2009 | Nagai et al. | |
| 2009/0252636 A1 | 10/2009 | Christopherson, Jr. et al. | |
| 2009/0258250 A1 | 10/2009 | Daemen et al. | |
| 2009/0285715 A1 | 11/2009 | Arjakine et al. | |
| 2010/0009089 A1 | 1/2010 | Junod et al. | |
| 2010/0028706 A1 | 2/2010 | Hornschu et al. | |
| 2010/0044348 A1 | 2/2010 | Buchmann | |
| 2010/0047622 A1 | 2/2010 | Fischer et al. | |
| 2010/0055495 A1 | 3/2010 | Sjodin | |
| 2010/0101780 A1 | 4/2010 | Ballew et al. | |
| 2010/0132408 A1 | 6/2010 | Billieres | |
| 2010/0136361 A1 | 6/2010 | Osuki et al. | |
| 2010/0155236 A1 | 6/2010 | Lee et al. | |
| 2010/0159136 A1 | 6/2010 | Lee et al. | |
| 2010/0166594 A1 | 7/2010 | Hirata et al. | |
| 2010/0189588 A1 | 7/2010 | Kawatsu et al. | |
| 2010/0192476 A1 | 8/2010 | Theisen et al. | |
| 2010/0258217 A1 | 10/2010 | Kuehmann | |
| 2011/0004069 A1 | 1/2011 | Ochs et al. | |
| 2011/0031222 A1 | 2/2011 | Branagan et al. | |

(56) References Cited

U.S. PATENT DOCUMENTS

| | | |
|---|---|---|
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055899 A1 | 3/2012 | Parmaningsih |
| 2012/0055903 A1 | 3/2012 | Izutani et al. |
| 2012/0100390 A1 | 4/2012 | Kuroda |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0258273 A1 | 10/2012 | Churchill et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0220523 A1 | 8/2013 | Cheney |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0060707 A1 | 3/2014 | Wright et al. |
| 2014/0066851 A1 | 3/2014 | Cheney, II |
| 2014/0116575 A1 | 5/2014 | Cheney et al. |
| 2014/0131338 A1 | 5/2014 | Postle |
| 2014/0190594 A1 | 7/2014 | Branagan et al. |
| 2014/0219859 A1 | 8/2014 | Cheney |
| 2014/0234154 A1* | 8/2014 | Cheney .................. C22C 38/48 |
| | | 420/101 |
| 2014/0248509 A1 | 9/2014 | Cheney et al. |
| 2014/0263248 A1 | 9/2014 | Postle |
| 2014/0272388 A1 | 9/2014 | Knight et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0114525 A1 | 4/2015 | Valls Anglés |
| 2015/0118098 A1 | 4/2015 | Valls |
| 2015/0122552 A1 | 5/2015 | Wang et al. |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0328680 A1 | 11/2015 | Tuffile |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0144463 A1 | 5/2016 | Hellsten et al. |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0271736 A1 | 9/2016 | Han et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0022588 A1 | 1/2017 | Tang et al. |
| 2017/0044646 A1 | 2/2017 | Gong et al. |
| 2017/0080531 A1* | 3/2017 | Cheney .............. B23K 35/0261 |
| 2017/0145547 A1 | 5/2017 | Saal et al. |
| 2017/0253950 A1 | 9/2017 | Shinohara |
| 2017/0275740 A1 | 9/2017 | Bergman |
| 2018/0016664 A1 | 1/2018 | Hu |
| 2018/0021894 A1 | 1/2018 | Persoon et al. |
| 2018/0066343 A1 | 3/2018 | Bengtsson |
| 2018/0066345 A1 | 3/2018 | Cheney et al. |
| 2018/0094343 A1 | 4/2018 | Gerk et al. |
| 2018/0099877 A1 | 4/2018 | Chang et al. |
| 2018/0135143 A1 | 5/2018 | Snyder et al. |
| 2018/0195156 A1 | 7/2018 | Reed et al. |
| 2018/0216212 A1 | 8/2018 | Reed et al. |
| 2018/0230016 A1 | 8/2018 | Kaner et al. |
| 2018/0230578 A1 | 8/2018 | Srivastava et al. |
| 2018/0245190 A1 | 8/2018 | Snyder et al. |
| 2018/0265949 A1 | 9/2018 | Wolverton et al. |
| 2018/0272423 A1 | 9/2018 | Hu |
| 2019/0017154 A1 | 1/2019 | Kaner et al. |
| 2019/0024217 A1 | 1/2019 | Yolton |
| 2019/0055860 A1 | 2/2019 | Jones |
| 2019/0071318 A1 | 3/2019 | Kaner et al. |
| 2019/0084039 A1 | 3/2019 | Hu |
| 2019/0135646 A1 | 5/2019 | Turner et al. |
| 2019/0177820 A1 | 6/2019 | Larsson |
| 2019/0234151 A1 | 8/2019 | Olsen et al. |
| 2019/0300374 A1 | 10/2019 | Shevchenko et al. |
| 2019/0309399 A1 | 10/2019 | Badwe |
| 2019/0323107 A1 | 10/2019 | Srivastava et al. |
| 2019/0368014 A1 | 12/2019 | Liimatainen |
| 2019/0376165 A1 | 12/2019 | Wen |
| 2020/0001367 A1 | 1/2020 | Duffy et al. |
| 2020/0005975 A1 | 1/2020 | Jayaraman et al. |
| 2020/0048743 A1 | 2/2020 | Gong et al. |
| 2020/0063238 A1 | 2/2020 | Yolton |
| 2020/0063239 A1 | 2/2020 | Xu et al. |
| 2020/0078860 A1 | 3/2020 | Wright et al. |
| 2020/0149141 A1 | 5/2020 | Wu et al. |
| 2020/0172998 A1 | 6/2020 | Crudden et al. |
| 2020/0189918 A1 | 6/2020 | Saeuberlich et al. |
| 2020/0223007 A1 | 7/2020 | Keegan et al. |
| 2020/0308679 A1 | 10/2020 | Nymann |
| 2020/0316718 A1 | 10/2020 | Smathers |
| 2020/0325561 A1 | 10/2020 | Kaner |
| 2020/0370149 A1 | 11/2020 | Gong |
| 2020/0385845 A1 | 12/2020 | Gong |
| 2021/0040585 A1 | 2/2021 | Alabort |
| 2021/0046543 A1 | 2/2021 | Larsson |
| 2021/0062305 A1 | 3/2021 | Fang |
| 2021/0164081 A1 | 6/2021 | Eibl |
| 2021/0180157 A1 | 6/2021 | Bracci |
| 2021/0180162 A1 | 6/2021 | Vecchio |
| 2021/0180170 A1 | 6/2021 | Pike |
| 2021/0197524 A1 | 7/2021 | Maroli et al. |
| 2021/0222275 A1 | 7/2021 | Saboo et al. |
| 2021/0246537 A1 | 8/2021 | Maroli et al. |
| 2021/0254202 A1 | 8/2021 | Gong et al. |
| 2021/0262050 A1 | 8/2021 | Oshchepkov et al. |
| 2021/0286079 A1 | 9/2021 | Vecchio |
| 2021/0310106 A1 | 10/2021 | Wei et al. |
| 2021/0324498 A1 | 10/2021 | Hericher et al. |
| 2021/0332465 A1 | 10/2021 | Behera et al. |
| 2021/0387920 A1 | 12/2021 | Bouttes et al. |
| 2021/0402475 A1 | 12/2021 | Taneike et al. |
| 2022/0025492 A1 | 1/2022 | Schade et al. |
| 2022/0041449 A1 | 2/2022 | Larsson et al. |

(56) References Cited

U.S. PATENT DOCUMENTS

| | | |
|---|---|---|
| 2022/0081745 A1 | 3/2022 | Komal et al. |
| 2022/0165463 A1 | 5/2022 | Vidarsson et al. |
| 2022/0219231 A1 | 7/2022 | Eibl |
| 2022/0220583 A1 | 7/2022 | Ota et al. |
| 2022/0220584 A1 | 7/2022 | Wang et al. |
| 2022/0404035 A1 | 12/2022 | Gattei |

FOREIGN PATENT DOCUMENTS

| | | |
|---|---|---|
| CN | 1033292 | 6/1989 |
| CN | 1225629 C | 11/2005 |
| CN | 101016603 | 8/2007 |
| CN | 101948994 | 1/2011 |
| CN | 101994076 | 3/2011 |
| CN | 102233490 A | 11/2011 |
| CN | 102286702 | 12/2011 |
| CN | 102335798 | 2/2012 |
| CN | 102357750 A | 2/2012 |
| CN | 102936724 | 2/2013 |
| CN | 103628017 | 3/2014 |
| CN | 103785967 | 5/2014 |
| CN | 104093510 | 10/2014 |
| CN | 104625473 | 5/2015 |
| CN | 104694840 | 6/2015 |
| CN | 104805391 | 7/2015 |
| CN | 105057913 | 11/2015 |
| CN | 105483539 | 4/2016 |
| CN | 106119838 | 11/2016 |
| CN | 108607983 | 10/2018 |
| DE | 27 54 437 | 7/1979 |
| DE | 33 20 513 | 12/1983 |
| DE | 42 02 828 | 8/1993 |
| DE | 4411296 | 7/1995 |
| DE | 10 320 397 A1 | 12/2004 |
| DE | 10329912 | 6/2005 |
| EP | 0 346 293 | 12/1989 |
| EP | 0 365 884 | 5/1990 |
| EP | 0 774 528 | 5/1997 |
| EP | 0 740 591 | 3/1999 |
| EP | 1 077 268 | 2/2001 |
| EP | 0 939 139 | 10/2001 |
| EP | 1 270 755 | 1/2003 |
| EP | 1 279 748 | 1/2003 |
| EP | 1 279 749 | 1/2003 |
| EP | 1 120 472 | 7/2003 |
| EP | 1 477 579 | 11/2004 |
| EP | 1 361 288 | 9/2006 |
| EP | 1 721 999 | 11/2006 |
| EP | 1 857 204 | 11/2007 |
| EP | 1 694 876 | 1/2008 |
| EP | 1 953 252 | 8/2008 |
| EP | 2 050 533 | 4/2009 |
| EP | 2 305 415 | 4/2011 |
| EP | 2 388 345 | 11/2011 |
| EP | 2 628 825 | 8/2013 |
| EP | 2 639 323 | 9/2013 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 777 869 | 9/2014 |
| EP | 2 778 247 | 9/2014 |
| EP | 2 873 747 | 5/2015 |
| EP | 2 563 942 | 10/2015 |
| EP | 2 064 359 | 4/2016 |
| EP | 3 034 211 | 6/2016 |
| EP | 3 034 637 B1 | 6/2016 |
| EP | 2 235 225 | 10/2016 |
| EP | 3 093 858 | 11/2016 |
| EP | 2 659 014 | 4/2017 |
| EP | 3 156 155 | 4/2017 |
| EP | 2 147 445 | 5/2017 |
| EP | 2 252 419 | 6/2017 |
| EP | 2 265 559 | 6/2017 |
| EP | 2 329 507 | 6/2017 |
| EP | 2 285 996 | 8/2017 |
| EP | 3 211 108 | 8/2017 |
| EP | 1 700 319 | 10/2017 |
| EP | 2 207 907 | 12/2017 |
| EP | 2 788 136 | 1/2018 |
| EP | 2 414 554 B1 | 2/2018 |
| EP | 3 145 660 | 4/2018 |
| EP | 2 432 908 B1 | 5/2018 |
| EP | 2 181 199 | 8/2018 |
| EP | 2 477 784 | 8/2018 |
| EP | 2 695 171 | 8/2018 |
| EP | 3 354 758 | 8/2018 |
| EP | 1 799 380 | 9/2018 |
| EP | 3 266 892 | 10/2018 |
| EP | 3 444 452 | 2/2019 |
| EP | 2 265 739 | 6/2019 |
| EP | 3 259 095 | 6/2019 |
| EP | 1 844 172 | 7/2019 |
| EP | 3 517 642 | 7/2019 |
| EP | 3 115 472 | 10/2019 |
| EP | 3 552 740 | 10/2019 |
| EP | 2 155 921 | 11/2019 |
| EP | 3 350 354 | 2/2020 |
| EP | 3 611 280 | 2/2020 |
| EP | 3 354 764 | 3/2020 |
| EP | 3 149 216 | 4/2020 |
| EP | 2 403 966 B1 | 5/2020 |
| EP | 3 362 210 | 5/2020 |
| EP | 3 134 558 | 7/2020 |
| EP | 3 514 253 | 10/2020 |
| EP | 3 333 275 | 11/2020 |
| EP | 3 653 736 | 12/2020 |
| EP | 3 411 169 | 1/2021 |
| EP | 1 848 836 B1 | 4/2021 |
| EP | 3 822 007 | 5/2021 |
| EP | 2 671 669 | 6/2021 |
| EP | 3 925 771 | 12/2021 |
| EP | 3 926 064 | 12/2021 |
| EP | 3 991 879 | 5/2022 |
| EP | 3 995 234 | 5/2022 |
| FR | 2055735 | 4/1971 |
| FR | 2218797 | 9/1974 |
| GB | 465999 | 5/1937 |
| GB | 956740 | 4/1964 |
| GB | 1073621 | 6/1967 |
| GB | 2153846 A | 8/1985 |
| GB | 2273109 | 6/1994 |
| GB | 2546809 | 5/2018 |
| GB | 2579580 | 7/2020 |
| GB | 2567492 | 9/2020 |
| GB | 2584654 | 12/2020 |
| GB | 2584905 | 12/2020 |
| IN | MUMNP-2003-00842 | 4/2005 |
| JP | 43-019745 | 8/1968 |
| JP | 45-026214 | 10/1970 |
| JP | 47-1685 | 1/1972 |
| JP | 49-056839 | 6/1974 |
| JP | 58-132393 | 8/1983 |
| JP | 59-16951 | 1/1984 |
| JP | 59-16952 | 1/1984 |
| JP | 59-150692 | 8/1984 |
| JP | 60-133996 | 7/1985 |
| JP | 6031897 B1 | 7/1985 |
| JP | 61-283489 | 12/1986 |
| JP | 63-026205 | 2/1988 |
| JP | 63-42357 | 2/1988 |
| JP | 63-65056 | 3/1988 |
| JP | 63-089643 | 4/1988 |
| JP | 63-213628 | 9/1988 |
| JP | 03-133593 | 6/1991 |
| JP | 03-248799 | 11/1991 |
| JP | 04-237592 | 8/1992 |
| JP | 04-246142 | 9/1992 |
| JP | 04-358046 | 12/1992 |
| JP | 07-179997 | 7/1995 |
| JP | 07-268524 | 10/1995 |
| JP | 08-134570 | 5/1996 |
| JP | 09-95755 | 4/1997 |

(56) References Cited

FOREIGN PATENT DOCUMENTS

| | | |
|---|---|---|
| JP | 09-108887 | 4/1997 |
| JP | 2001-066130 | 3/2001 |
| JP | 2001-303233 | 10/2001 |
| JP | 2002-241919 | 8/2002 |
| JP | 2003-205352 | 7/2003 |
| JP | 2004-149924 | 5/2004 |
| JP | 2005-042152 | 2/2005 |
| JP | 2005-290406 | 10/2005 |
| JP | 2007-154284 | 6/2007 |
| JP | 2008-261329 | 10/2008 |
| JP | 2010-138440 | 6/2010 |
| JP | 2010-138491 | 6/2010 |
| JP | 2012-000616 | 1/2012 |
| JP | 2014-047388 | 3/2014 |
| JP | 2015-083715 | 4/2015 |
| JP | 2015-526596 | 9/2015 |
| KR | 10-0935816 B1 | 1/2010 |
| SU | 1706398 | 1/1992 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/080978 | 8/2006 |
| WO | WO 06/086350 | 8/2006 |
| WO | WO 07/120194 | 10/2007 |
| WO | WO 08/042330 | 4/2008 |
| WO | WO 08/060226 | 5/2008 |
| WO | WO 08/082353 | 7/2008 |
| WO | WO 08/105788 | 9/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/091479 | 8/2011 |
| WO | WO 11/152774 | 12/2011 |
| WO | WO 11/158706 | 12/2011 |
| WO | WO 12/021186 | 2/2012 |
| WO | WO 12/022874 | 2/2012 |
| WO | WO 12/112844 | 8/2012 |
| WO | WO 12/162226 | 11/2012 |
| WO | WO 13/049056 | 4/2013 |
| WO | WO 13/055652 | 4/2013 |
| WO | WO 13/060839 | 5/2013 |
| WO | WO 13/102650 | 7/2013 |
| WO | WO 13/126134 | 8/2013 |
| WO | WO 13/152306 | 10/2013 |
| WO | WO 13/167580 | 11/2013 |
| WO | WO 13/167628 | 11/2013 |
| WO | WO 13/185174 | 12/2013 |
| WO | WO 14/001544 | 1/2014 |
| WO | WO 14/023646 | 2/2014 |
| WO | WO 14/070006 | 5/2014 |
| WO | WO 14/081491 | 5/2014 |
| WO | WO 14/083544 | 6/2014 |
| WO | WO 14/085319 | 6/2014 |
| WO | WO 14/090922 | 6/2014 |
| WO | WO 14/114714 | 7/2014 |
| WO | WO 14/114715 | 7/2014 |
| WO | WO-2014127062 A2 * | 8/2014 ................ B22F 7/04 |
| WO | WO 14/187867 | 11/2014 |
| WO | WO 14/197088 | 12/2014 |
| WO | WO 14/201239 | 12/2014 |
| WO | WO 14/202488 | 12/2014 |
| WO | WO 15/028358 | 3/2015 |
| WO | WO 15/049309 | 4/2015 |
| WO | WO 15/075122 | 5/2015 |
| WO | WO 15/183955 | 12/2015 |
| WO | WO 16/003520 | 1/2016 |
| WO | WO 16/010599 | 1/2016 |
| WO | WO 16/041977 | 3/2016 |
| WO | WO 16/099390 | 6/2016 |
| WO | WO 16/124532 | 8/2016 |
| WO | WO 16/131702 | 8/2016 |
| WO | WO 17/041006 | 3/2017 |
| WO | WO 17/046517 | 3/2017 |
| WO | WO 17/059026 | 4/2017 |
| WO | WO 17/063923 | 4/2017 |
| WO | WO 17/091743 | 6/2017 |
| WO | WO 17/132286 | 8/2017 |
| WO | WO 17/132322 | 8/2017 |
| WO | WO 17/134039 | 8/2017 |
| WO | WO 17/157835 | 9/2017 |
| WO | WO 17/162499 | 9/2017 |
| WO | WO 17/186468 | 11/2017 |
| WO | WO 17/200797 | 11/2017 |
| WO | WO 18/015547 | 1/2018 |
| WO | WO 18/021409 | 2/2018 |
| WO | WO 18/050474 | 3/2018 |
| WO | WO 18/065614 | 4/2018 |
| WO | WO 18/04179 | 6/2018 |
| WO | WO 18/114845 | 6/2018 |
| WO | WO 18/138247 | 8/2018 |
| WO | WO 18/138270 | 8/2018 |
| WO | WO 18/145032 | 8/2018 |
| WO | WO 18/232618 | 12/2018 |
| WO | WO 19/021015 | 1/2019 |
| WO | WO 19/043219 | 3/2019 |
| WO | WO 19/047587 | 3/2019 |
| WO | WO 19/108596 | 6/2019 |
| WO | WO 19/125637 | 6/2019 |
| WO | WO 19/145196 | 8/2019 |
| WO | WO 19/166749 | 9/2019 |
| WO | WO 19/194869 | 10/2019 |
| WO | WO 19/197376 | 10/2019 |
| WO | WO 19/215450 | 11/2019 |
| WO | WO 20/007652 | 1/2020 |
| WO | WO 20/043718 | 3/2020 |
| WO | WO 20/053518 | 3/2020 |
| WO | WO 20/065296 | 4/2020 |
| WO | WO 20/065297 | 4/2020 |
| WO | WO 20/074241 | 4/2020 |
| WO | WO 20/115478 | 6/2020 |
| WO | WO 20/120563 | 6/2020 |
| WO | WO 20/201437 | 10/2020 |
| WO | WO 20/201438 | 10/2020 |
| WO | WO 21/089851 | 5/2021 |
| WO | WO 21/217512 | 11/2021 |
| WO | WO 21/219564 | 11/2021 |
| WO | WO 21/231285 | 11/2021 |
| WO | WO 21/247981 | 12/2021 |
| WO | WO 22/113466 | 6/2022 |
| WO | WO 22/149539 | 7/2022 |

OTHER PUBLICATIONS

Audouard, et al., Mar. 26-31, 2000, Corrosion Performance and Field Experience With Super Duplex and Super Austenitic Stainless Steels in FGD Systems, Corrosion 2000, 8 pp.

Azo Materials, "Stainless Steel—Grade 420," Oct. 23, 2001, <https://www.azom.com/article.aspx?ArticleID=972>, accessed Aug. 15, 2017.

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

(56) References Cited

OTHER PUBLICATIONS

C—Mo Phase Diagram [online], [retrieved on Jan. 27, 2015]. Retrieved from the Internet: <URL:http://factsage.cn/fact/documentation/SGTE/C-Mo.jpg.

C—Nb Phase Diagram [online], [retrieved on Jan. 27, 2015]. Retrieved from the Internet: <URL:http://www.crct.polymtl.ca/fact/documentation/BINARY/C-Nb.jpg.

Conversion Chart of Vickers Hardness (HV) to Rockwell C (HCR).

Cr—C Phase Diagram [online], [retrieved on Jan. 27, 2015]. Retrieved from the Internet: http://www.azom.com/work/3ud2quvLOU9g4VBMjVEh_files/image002.gif.

Crucible Industries LLC, Jun. 3, 2010, Crucible CPM S90V® data sheet, retrieved from the internet Mar. 14, 2019, https://www.crucible.com/PDFs/DataSheets2010/dsS90v1%202010.pdf, 2 pp.

Davis, Jr, ed. Dec. 1994, Stainless steels. ASM International, Materials Park, OH, p. 447.

Fujiki et al., 1988, The sintering phenomena and heat-treated properties of carbides and borides precipitated p/m alloys made of H.S.S. powder, Japan Society of Powder and Powder Metallurgy, 35(3):119-123.

Gorni, Oct. 9, 2003, Austenite transformation temperatures: ferrite start and finish, in Steel Forming and Heath Treating Handbook, pp. 26-43.

Iron-Carbon (Fe-C) Phase diagram [online], [retrieved on Jan. 27, 2014]. Retrieved from the internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Kumashiro et al., May 31, 1980, The vickers micro-hardness of nonstoichiometric niobium carbide and vanadium carbide single crystals up to 1500c, Journal of Materials Science, 15(5):1321-1324.

Kushner et al., 1992, Thermal Spray Coatings, in Blau (ed) ASM Handbook, vol. 18, Friction, Lubrication, and Wear Technolgoy, pp. 829-833.

Kutsova, Nov. 9, 2015, The Influence of alloying elements on structure formation, phase composition and properties of chromium-manganese iron in the cast state, Metallurgical and Mining Industry, 1084.

Li et al., Feb. 28, 2000, Temperature dependence of the hardness of single-phase cementite films prepared by an electron-shower PVD method, Journal of the Japan Institute of Metals and Materials, 64(2):134-140.

Liu et al., Jan. 14, 2000, Measurement of austenite-to-ferrite transformation temperature after multi-pass deformation of steels, Materials Science and Engineering A, 194(1):L15-L18.

Miracle, D.B.: The efficient cluster packing model—An atomic structural model for metallic glasses, Acta Materialia vol. 54, Issue 16, Sep. 2006, pp. 4317-4336.

Miyoshi et al., Apr. 25, 1965, High temperature hardness of Wc, Tic, TaC, NbC and their mixed carbides, Journal of the Japan Society of Powder and Powder Metalurgy, 12(2):78-84.

Ohmura, Dec. 2003, Evaluation of temper softening behavior of Fe—C binary martensitic steels by nanoindentation, Scripta Materialia, 49(12):1157-1162.

Senkov et al., Jun. 23, 2010, Refractory high-entropy alloys, Intermetallics, 18:1758-1765.

Teng: "Processing, Microstructures, and Properties of Aluminide-Strengthened Ferritic Steels," The University of Tennessee, Knoxville, Dec. 2011.

Tillack, et al.: "Selection of Nickel, Nickel-Copper, Nickel-Cromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet:<URL:http://www.calphad.com/titaniumboron.html>.

Tucker , 2013, Introduction to Thermal Spray Technology, ASM Handbook, vol. 5A, pp. 3-9.

Wang et al., Jul. 2014, Effect of molybdenum, manganese and tungsten contents on the corrosion behavior and hardness of iron-based metallic glasses, Materials and Corrosion, 65(7):733-741.

Wank et al., 2007, Behavior of thermally sprayed wear protective coatings exposed to different abrasive wear conditions in comparison to hard chromium platings, 7 pp.

Wayne, 1985, Iron-rich low-coast superalloys, PhD dissertation, University of Connecticut, 184 pp.

Wikipedia, Refractory metals, https://en/wikipedia.org/wiki/Refractory_metals.

Yamamoto et al., 2014, Influence of Mo and W on high temperature hardness of M7C3 carbide in high chromium white cast iron, Materials Transactions, 55(4):684-689.

Yano et al., Apr. 2011, Modification of NiAl intermetallic coatings processed by PTA with chromium carbides, ASTM International Journal, 8(4):190-204.

Yoo et al., Jun. 2006, The effect of boron on the wear behavior of iron-based hardfacing alloys for nuclear power plants valves, Journal of Nuclear Materials, 352:90-96.

Zhu et al., 2017, Microstructure and sliding wear performance of Cr7C3—(Ni,Cr)3(Al,Cr) coating deposited from Cr7C3 in situ formed atomized powder, J. Therm Spray Tech, 26:254-264.

International Search Report and Written Opinion re PCT Application No. PCT/US2020/041006, mailed Oct. 16, 2020.

Boniardi et al., 2015, Schaeffler Diagrams, in Encyclopedia of Iron, Steel, and their Alloys, Taylor & Francis, pp. 3129-3141.

Pawar et al., 2019, Effect of different carbides on the wear resistance of FE-based hardfacing alloys, International Journal of Refractory Metals & Hard Metals, 78:288-295.

* cited by examiner

Microstructure of Arc Melted X12 Ingot

Microstructure of Arc Melted X9 Ingot

IRON-BASED ALLOYS DESIGNED FOR WEAR AND CORROSION RESISTANCE

INCORPORATION BY REFERENCE TO ANY PRIORITY APPLICATIONS

This application claims from the benefit of U.S. App. No. 62/872,105, filed Jul. 9, 2019, and entitled "IRON-BASED ALLOYS DESIGNED FOR WEAR AND CORROSION RESISTANCE", and U.S. App. No. 62/952,668, filed Dec. 23, 2019, and entitled "CORROSION AND WEAR RESISTANT FERRITIC ALLOYS", the entirety of each of which is incorporated by reference herein.

BACKGROUND

Field

Embodiments of the disclosure generally relate to ferritic, iron-based alloys having high wear resistance.

Description of the Related Art

The automotive industry is increasingly interested in brake discs with improved wear and corrosion compared to standard gray cast iron commonly used. Alternative technologies such as composite brake discs are frequently unattractive for mass production due to high costs.

Two factors are driving this market trend. First is the increasing pressure from regulators to reduce fine particulate emissions originating from the wear of brake discs. Second is the decreasing use of friction braking in vehicles capable of regenerative braking resulting the corrosion of cast iron brakes. The visible corrosion (rust) is both an issue of aesthetics and can reduce braking effectiveness. As a result, the alloys and coatings described in this disclosure have high potential for providing the improved brake disc performance the market is interested in. Further, because alloys of this disclosure are iron based, they have a competitive cost compared to more expensive metals and composites.

Many coating applications, there is strong regulatory and safety pressure to reduce or eliminate the use of nickel and/or cobalt. Both these materials are commonly used as a metallic phase in thermal spray and other coatings. Alloys of this disclosure are iron based and specifically limit cobalt and nickel improving their attractiveness for numerous wear and corrosion applications.

Previous iterations of hardfacing coatings have focused on iron alloys with a martensitic matrix, the hardest form of steel to form a hardfacing coating. 431 stainless steel (SS) which is offered by Metco and others is the standard alloy used in this application. Further, U.S. Pat. Nos. 7,491,910, 8,961,869, and 9,802,387, as well as U.S. Pat. Pub. No. 2005/013924, the entirety of each of which is hereby incorporated by reference, teach a reduced ferrite content, high martensite content to produce a material with high hardness.

SUMMARY

Disclosed herein are embodiments of a cladding feedstock comprising Fe and, in wt. % Cr: about 10 to about 26, Nb+Ti+V: about 2 to about 12, and C: about 0.5 to about 1.5.

In some embodiments, the feedstock comprises Fe and, in wt. % Cr: about 16 to about 26, Ti: about 0.4 to about 2.4, Mo: 0.8 to 3.6, Nb: about 4 to about 6, and C: about 0.6 to about 1.2.

In some embodiments, the feedstock comprises Fe and, in wt. % Cr: about 18 to about 25, Ti: about 0.45 to about 2.2, Mo: 0.9 to 3.3, Nb: about 4.5 to about 5.5, and C: about 0.7 to about 1.1.

In some embodiments, the feedstock further comprises, in wt. %, B: 0.3-0.5.

Disclosed herein are embodiments of a cladding feedstock comprising Fe and, in wt. %: Cr: about 10 to about 25; Ni: up to about 4; Nb+Ti+V: about 2 to about 10; and C: about 0.5 to about 1.5.

In some embodiments, the feedstock can comprise Fe and, in wt. %: Cr: about 13.6 to about 20.4; Ni: about 1.2 to about 1.6; Ti: about 1.6 to about 2.4; Nb: about 4 to about 6; and C: about 0.8 to about 1.2. In some embodiments, the feedstock comprises Fe and, in wt. %: Cr: about 15.3 to about 18.7; Ni: about 1.35 to about 1.65; Ti: about 1.8 to about 2.2; Nb: about 4.5 to about 5.5; and C: about 0.9 to about 1.1.

In some embodiments, the feedstock can be characterized by having, under thermodynamic conditions, a total ferrite phase mole fraction of about 50 mol. % or higher at all temperatures below the solidus and above 500 K. In some embodiments, the total ferrite phase mole fraction can be about 60 mol. % or higher at all temperatures below the solidus and above 500 K. In some embodiments, the total ferrite phase mole fraction can be about 70 mol. % or higher at all temperatures below the solidus and above 500 K. In some embodiments, the feedstock can be characterized by having, under thermodynamic conditions, a total ferrite phase mole fraction of about 90 mol. % or higher at elevated temperatures just below the solidus temperature.

In some embodiments, the feedstock can be characterized by having, under thermodynamic conditions, a primary carbide formation temperature between about 1750 K and about 2100 K. In some embodiments, the primary carbide formation temperature can be between about 1850 K and about 2000 K.

In some embodiments, the feedstock can be characterized by having, under thermodynamic conditions, a total primary carbide mole fraction of about 5 mol. % or higher at 1300 K. In some embodiments, the total primary carbide mole fraction can be about 7.5 mol. % or higher at 1300 K. In some embodiments, the total primary carbide mole fraction can be about 10 mol. % or higher at 1300 K.

In some embodiments, the feedstock can be formed through gas atomization process.

In some embodiments, the coating can comprise a ferrite matrix, and a plurality of primary carbides, wherein the primary carbides are embedded in the ferrite matrix.

In some embodiments, the plurality of primary carbides can comprise at least one of Nb, Ti, and V. In some embodiments, the plurality of primary carbides can comprise an isolated and spherical morphology.

In some embodiments, the coating can have a total primary carbide volume fraction of at least about 5 vol. %. In some embodiments, the total primary carbide volume fraction can be at least about 7.5 vol. %. In some embodiments, the total primary carbide volume fraction can be at least about 10 vol. %. In some embodiments, the coating can have a Cr content of the ferrite matrix of at least about 12 wt. %. In some embodiments, the Cr content of the ferrite matrix can be at least about 15 wt. %. In some embodiments, the Cr content of the ferrite matrix is at least about 19 wt. %.

In some embodiments, the coating can have a hardness of about 450 HV 0.3 or lower. In some embodiments, the hardness can be about 400 HV 0.3 or lower. In some embodiments, the hardness can be about 350 HV 0.3 or lower.

In some embodiments, the coating can have an ASTM G65 Procedure A volume loss of about 200 mm³ or less. In some embodiments, the ASTM G65 Procedure A volume loss can be about 150 mm³ or less. In some embodiments, the ASTM G65 Procedure A volume loss can be about 100 mm³ or less.

In some embodiments, the coating can be configured to be formed through a deposition process. In some embodiments, the coating can be configured to be formed by a process selected from the group consisting of thermal spray, plasma transferred arc welding, laser cladding, and ultra-high speed laser cladding.

Also disclosed are embodiments of applying the feedstock as disclosed herein as a coating.

In some embodiments, the feedstock can be a powder. In some embodiments, the feedstock can be one or more wires.

Disclosed herein are embodiments of a thermal spray feedstock material comprising Fe and, in wt. %, Cr: about 14-about 35, Mo+W: about 0-about 16, and B: about 0.2-about 2.8.

In some embodiments, the feedstock material can further comprise Cr: about 20-about 34, Mo+W: about 0-about 6, B: about 0.8-about 1.8, and Nb+Ti: about 1-about 4. In some embodiments, the feedstock material can further comprise Cr: about 15-about 34, Mo+W: about 1-about 16, B: about 0.3-about 2.7, Nb+Ti: about 1 about 10, and C: about 0-about 1.2. In some embodiments, the feedstock material can further comprise Cr: about 15-about 30, Mo+W: about 0-about 6, B: about 0.2-about 1.0, Nb+Ti: about 5-about 12, and C: about 0.4-about 1.4.

In some embodiments, the feedstock material includes less than about 1 wt. % C. In some embodiments, the feedstock material includes less than about 0.5 wt. % C. In some embodiments, the feedstock material includes less than about 0.25 wt. % C. In some embodiments, the feedstock material includes less than about 0.1 wt. % C. In some embodiments, the feedstock material includes less than about 5 wt. % Ni. In some embodiments, the feedstock material includes less than about 1 wt. % Ni. In some embodiments, the feedstock material includes less than about 0.1 wt. % Ni.

In some embodiments, the feedstock material is a powder.

In some embodiments, the feedstock material is configured to form a matrix and is characterized by having, under thermodynamic equilibrium conditions a pitting resistance equivalent number as defined by the equation Cr+3.3*(Mo+0.5*W)+16*N of greater than about 17, less than 25 mole percent intermetallic phases, between about 7 and about 35 mole % hard phases, between about 2 and about 25 mole % borides, between about 1 and about 15 mole % MC carbides, and a liquidus temperature of less than about 2000K. In some embodiments, the feedstock material is configured to form a matrix and is characterized by having, under thermodynamic equilibrium conditions a pitting resistance equivalent number as defined by the equation Cr+3.3*(Mo+0.5*W)+16*N of greater than about 25, less than 8 mole percent intermetallic phases, between about 10 and about 22 mole % hard phases, a liquidus temperature of less than about 1900K.

In some embodiments, the feedstock material has a composition, in wt. %, of Cr: about 20.1, Nb: about 5.6, Mo: about 2.1, B: about 0.44, C: about 0.81, Ti: about 1.6, Fe: balance.

Also disclosed herein are embodiments of a coating formed from the feedstock material disclosed herein. In some embodiments, the coating comprises a volume fraction of hard phases between about 5 and about 35%, and a porosity of less than about 3%. In some embodiments, the coating comprises a volume fraction of hard phases between about 10 and about 25%, and a porosity of less than about 1%.

In some embodiments, the coating is applied to a brake disc.

Also disclosed herein are embodiments of a method of applying a metallic coating on a substrate, the method comprising thermally spraying the feedstock material disclosed herein on the substrate.

Also disclosed herein are embodiments of an iron based alloy feedstock comprising a matrix PREN greater than 20 at 1300K under equilibrium or near equilibrium solidification conditions, a mole fraction of hard phase between 5% and 25% at 1300K under equilibrium or near equilibrium solidification conditions, and a solidus less than 2000K under equilibrium or near equilibrium solidification conditions.

In some embodiments, the alloy feedstock comprises, in weight percent, between 1.0 and 10.0 niobium plus titanium. In some embodiments, the matrix at 1300K has, in weight percent, greater than 15% Cr. In some embodiments, a mole fraction of intermetallic phases at 800 deg. K is less than 25% under equilibrium or near equilibrium solidification conditions.

In some embodiments, the alloy is atomized to form a powder. In some embodiments, the alloy feedstock is deposited on to a substrate to form a wear and corrosion resistant coating. In some embodiments, an arc melted microstructure of the alloy feedstock comprises between 8% and 30% hardphases by volume. In some embodiments, an arc melted ingot microstructure comprises a matrix PREN greater than 20.

In some embodiments, the alloy feedstock is configured to be deposited via laser cladding or ultra-high speed laser cladding. In some embodiments, the alloy feedstock is deposited onto a brake disc wear surface.

In some embodiments, the alloy feedstock comprises, at 1300K under equilibrium solidification conditions, between 3 and 26% mole fraction borides. In some embodiments, the alloy feedstock comprises less than 10% FCC austenite at 1300 k under equilibrium conditions.

Further disclosed herein are embodiments of a cladding feedstock comprising Fe and, under thermodynamic conditions a total ferrite mole fraction of above about 50%, a ferrite matrix comprising at least about 12 wt. % Cr, and a mole fraction of hard phases precipitating from liquid greater than about 5%.

In some embodiments, the hard phases are carbides. In some embodiments, the carbides are FCC carbides. In some embodiments, the hard phases are borides. In some embodiments, the hard phases comprise both borides and carbides.

Also disclosed are embodiments of a coating as disclosed herein.

Also disclosed are embodiments of a feedstock as disclosed herein.

5

Figure 3:
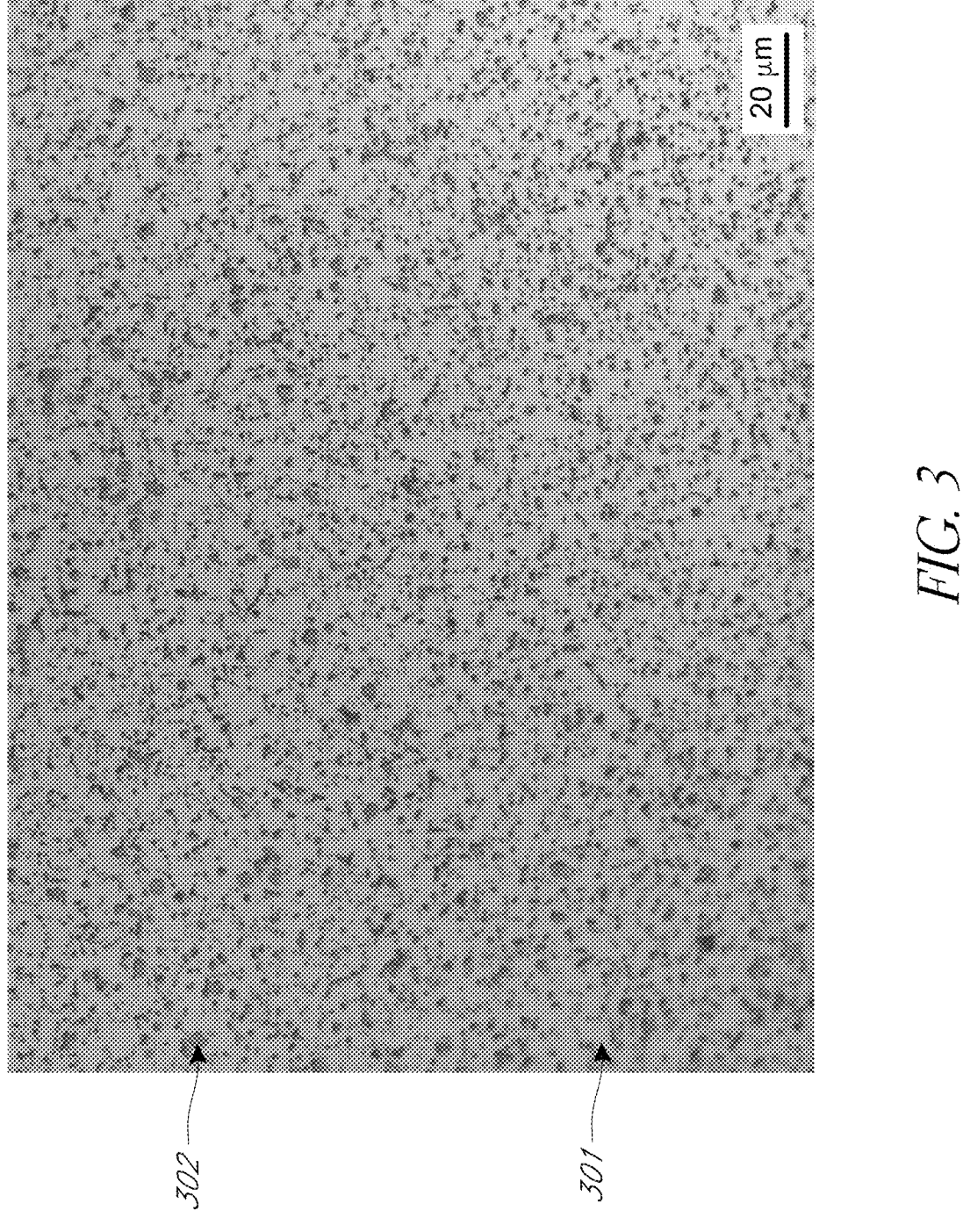

FIG. 3 shows an embodiment of a microstructure of an alloy of the disclosure as a PTA weld overlay coating.

Figure 4:
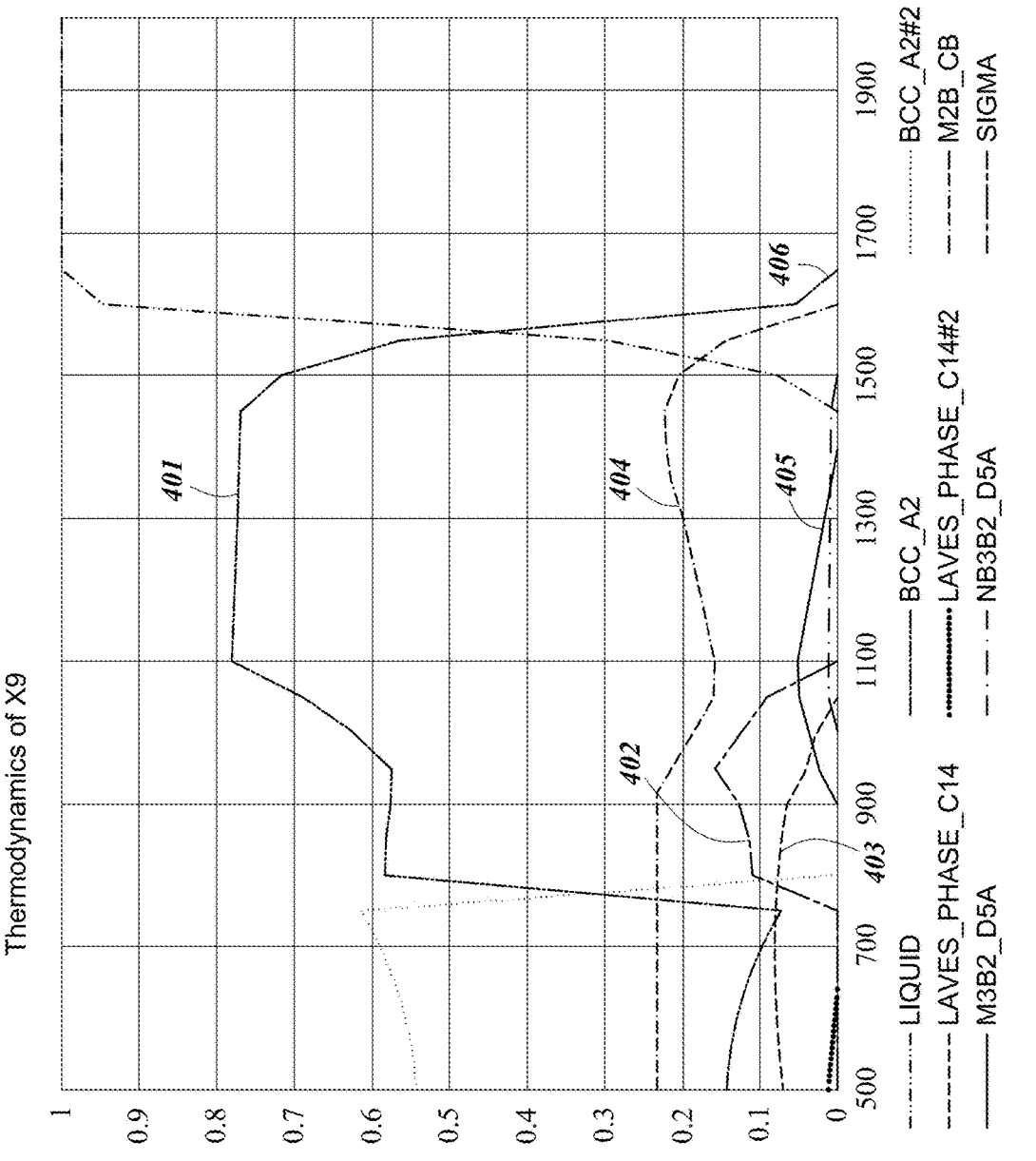

FIG. 4 illustrates an embodiment of a thermodynamic solidification diagram of an alloy of the disclosure.

Figure 5:
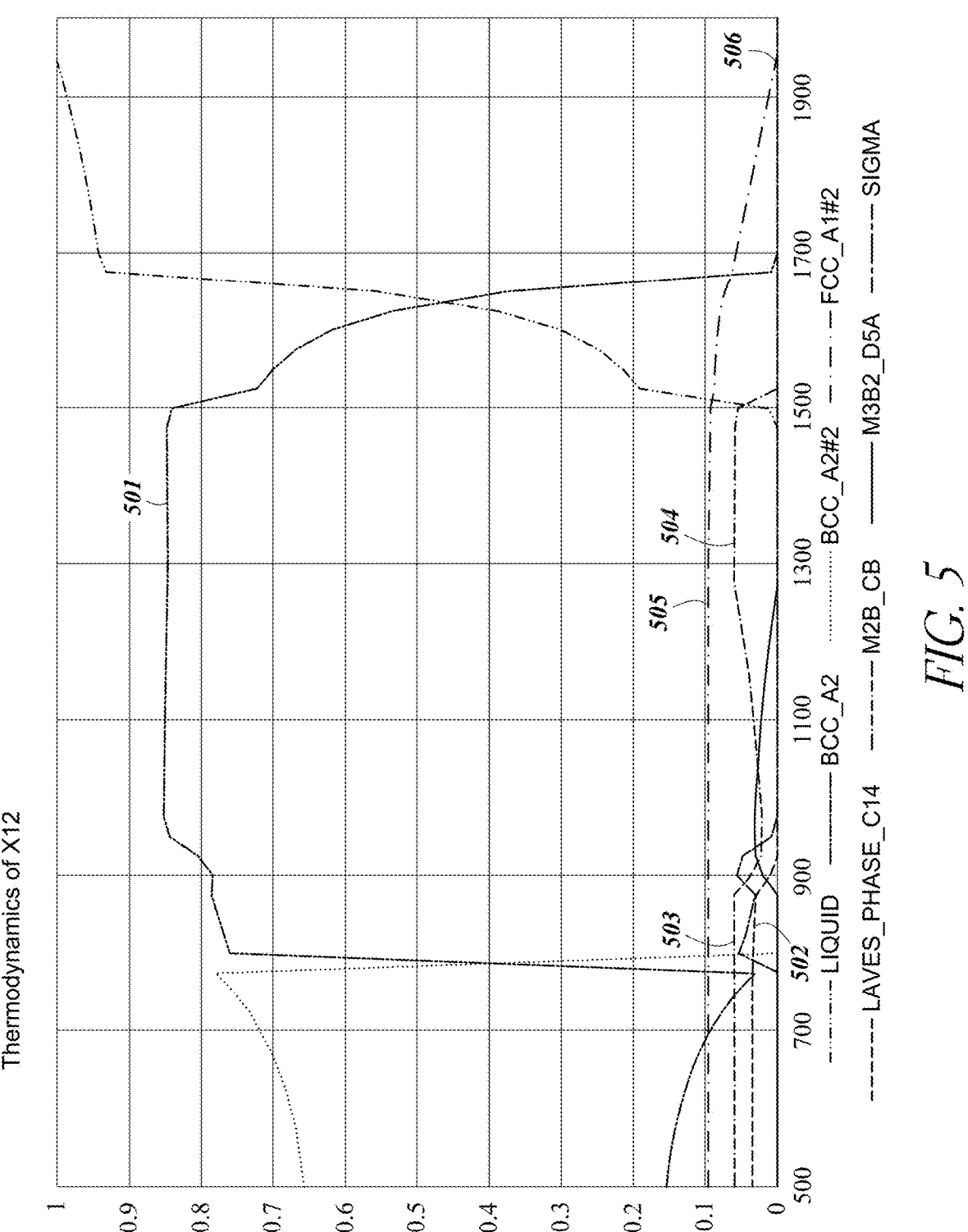

FIG. 5 illustrates an embodiment of a thermodynamic solidification diagram of an alloy of the disclosure.

Figures 6, 7:
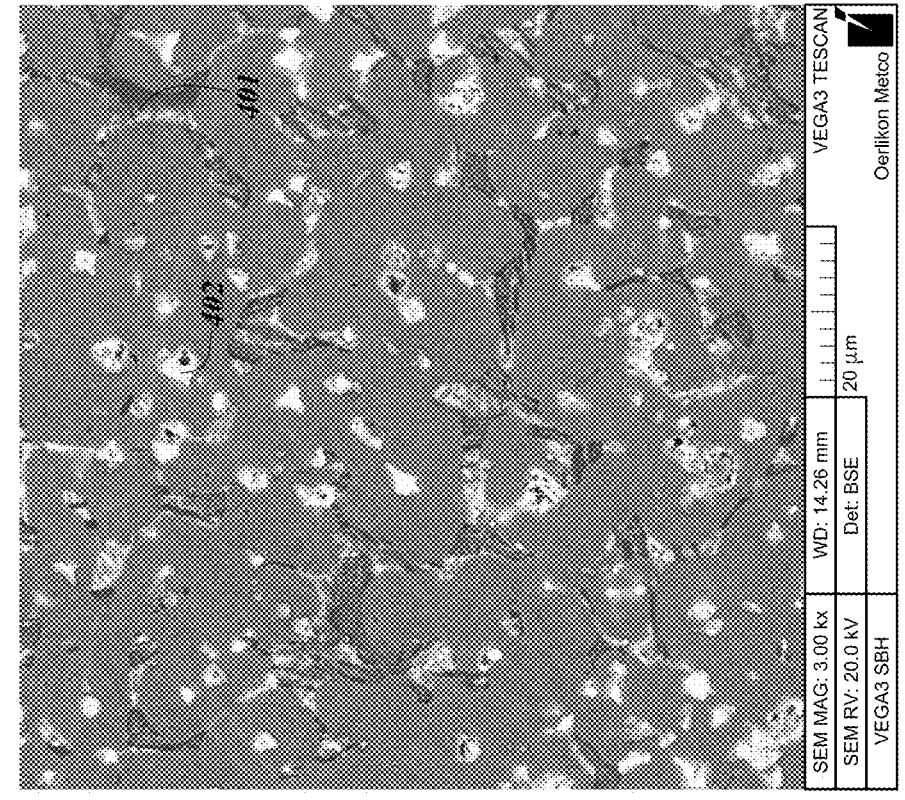

FIG. 6 illustrates microstructure of an arc melted ingot of an alloy of the disclosure.

FIG. 7 illustrates microstructure of an arc melted ingot of an alloy of the disclosure.

Figure 8:
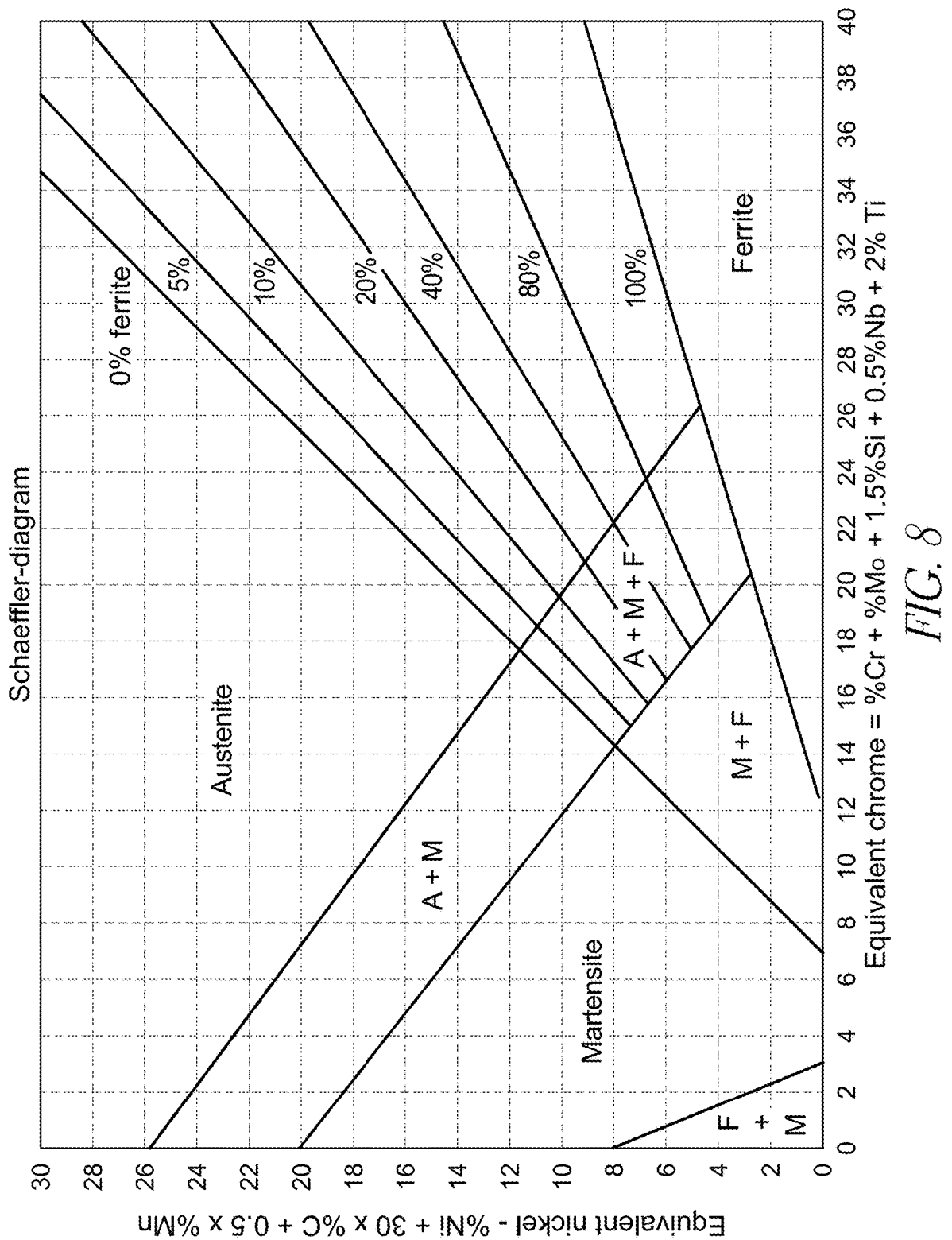

FIG. 8 illustrates an embodiment of a Schaeffer diagram.

DETAILED DESCRIPTION

Disclosed herein are embodiments of an alloy having a ferritic structure, rather than a martensitic matrix, and consequently a lower hardness than typical hardfacing products. However, embodiments of the disclosure have excellent wear resistance, where the wear resistance is provided in the form of hard carbide or hard boride or a combination of both hard carbide and hard boride particles. Due to the ferritic structure, the coating can be ground and machined much quicker than harder coatings known in the art, which is advantageous for many applications, including for use with hydraulic rods. In some embodiments, the alloys described herein can be used as a hardbanding or hardfacing layers or coatings. In some embodiments, the alloy can be applied on a hydraulic rod as a layer or coating. In some embodiments, the alloys can have high corrosion resistance, for example similar to that of 431 stainless steel. This can be achieved, for example, through one or more of the in situ formation of a corrosion resistant matrix, controlled fraction of hard phases, and tough microstructure. Accordingly, embodiments of the disclosure can be an iron hardfacing alloy resistant to corrosion and having high wear resistance.

In some embodiments, the hard phases can be borides which are beneficial from a design standpoint as boron has a very low solid solution solubility with iron and iron alloys driving the precipitation of boride phases, even under the rapid cooling rates inherent in laser cladding and ultra-high speed laser cladding. In some embodiments, strong carbide formers may also be present to ensure precipitation during processing and minimal retained carbon in the matrix. With the presence of these beneficial phases, deleterious phases can be reduced or eliminated. These include intermetallic phases such as sigma or laves phases which can reduce the toughness and ductility of the alloy. Alloys of this disclosure can specifically minimize the fraction of intermetallic phases. An additional consideration addressed in this disclosure relates to the manufacturability of an alloy via atomization by controlling the liquidus temperature of the alloy.

In some embodiments, the alloys described herein can be configured to form a coating with two contrasting physical behaviors: 1) reduced hardness with the end result of an easily machinable coating (e.g., faster grinding/honing times of a clad coating), and 2) high abrasion/wear resistance. Generally low hardness will result in low abrasion resistance. However, embodiments of the alloys described herein are able to maintain a low hardness while exhibiting higher abrasion resistance than typical iron-based materials. Other advantageous features described herein can include crack resistance, compatibility with a gas atomization process, compatibility with laser and PTA welding, and corrosion resistance.

The alloys disclosed herein can be manufactured into a powder form using, for example, a gas atomization process, though the particular process is not limiting and other processes can be used as well. The powder can then be used in a variety of deposition processes, including thermal spray, high velocity oxygen fuel ("HVOF"), high velocity air fuel ("HVAF"), plasma spray, plasma transferred arc welding ("PTA"), laser cladding, and ultra-high speed laser cladding ("EHLA") to form a coating with certain microstructural features and performance characteristics.

As disclosed herein, the term alloy can refer to the chemical composition forming the powder disclosed within, the powder itself, the feedstock itself, a wire, the wire including a powder, the composition of the metal component formed by the heating and/or deposition of the powder (for example hardbanding/hardfacing layer), or other methodology, and the metal component.

In some embodiments, alloys manufactured into a solid or cored wire (a sheath containing a powder) for welding or for use as a feedstock for another process may be described by specific chemistries herein. For example, the wires can be used for a thermal spray. Further, the compositions disclosed below can be from a single wire or a combination of multiple wires (such as 2, 3, 4, or 5 wires).

Composition

In some embodiments, alloys can be fully characterized by their compositional ranges.

In some embodiments, the alloy can include, in weight percent:

Fe: BAL;
Cr: 10-26 (or about 10-about 26);
Nb+Ti+V: 2-10 (or about 2-about 10);
Mo: up to 3 (or up to about 3); and
C: 0.5-1.5 (or about 0.5-about 1.5).

In some embodiments, the above composition may include no nickel. In some embodiments, the above composition may include up to 4 wt. % nickel.

In some embodiments, the alloy can include, in weight percent:

Fe: BAL;
Cr: 10-26 (or about 10-about 26);
Nb+Ti+V: 2-12 (or about 2-about 12);
Mo: up to 3 (or up to about 3); and
C: 0.5-1.5 (or about 0.5-about 1.5).

In some embodiments, the above composition may include no nickel. In some embodiments, the above composition may include up to 4 wt. % nickel.

In some embodiments, the alloy can include, in weight percent:

Fe: BAL;
Cr: 16-26 (or about 16-about 26);
Ti: 0.4-2.4 (or about 0.4-about 2.4);
Mo: 0.8-3.6 (or about 0.8-about 3.6);
Nb: 4-6 (or about 4-about 6); and
C: 0.6-1.2 (or about 0.6-about 1.2).

In some embodiments, the above composition may include no nickel. In some embodiments, the above composition may include 1.2-1.6 (or about 1.2-about 1.6) wt. % nickel.

In some embodiments, the alloy may be described by the composition, in weight percent:

Fe: BAL;
Cr: 18-25 (or about 18-about 25);
Ti: 0.45-2.2 (or about 0.45-about 2.2);
Mo: 0.9-3.3 (or about 0.9-about 3.3);
Nb: 4.5-5.5 (or about 4.5-about 5.5); and
C: 0.7-1.1 (or about 0.7-about 1.1).

In some embodiments, the above composition may include no nickel. In some embodiments, the above composition may include 1.35-1.65 (or about 1.35 about 1.65) wt. % nickel.

In some embodiments, the alloy can include, in weight percent:

Fe: BAL
Cr: 16-24 (or about 13.6-about 20.4);
Mo: 0.8-1.2 (or about 0.8-about 1.2);
Ti: 0.4-2.4 (or about 0.4-about 2.4);
Nb: 4-6 (or about 4-about 6); and
C: 0.8-1.2 (or about 0.8-about 1.2).

In some embodiments, the alloy can include, in weight percent:

Fe: BAL
Cr: 18-22 (or about 13.6-about 20.4);
Mo: 0.9-1.1 (or about 0.8-about 1.2);
Ti: 0.45-2.2 (or about 0.45-about 2.4);
Nb: 4.5-5.5 (or about 4-about 6); and
C: 0.9-1.1 (or about 0.8-about 1.2).

In some embodiments, the alloy can include, in weight percent:

Fe: BAL;
Cr: 16-26 (or about 16-about 26);
Mo: 2-4 (or about 2-about 4);
Ti: 0.4-2.4 (or about 0.4-about 2.4);
Nb: 4-6 (or about 4-about 6);
C: 0.6-0.9 (or about 0.6-about 0.9); and
B: 0.3-0.5 (or about 0.3-about 0.5).

In some embodiments, the alloy can include, in weight percent:

Fe: BAL;
Cr: 18-24 (or about 18-about 24);
Mo: 2.5-3.5 (or about 2.5-about 3.5);
Ti: 0.4-2.2 (or about 0.4-about 2.2);
Nb: 4.5-5.5 (or about 4.5-about 5.5);
B: 0.35-0.45 (or about 0.35-about 0.45); and
C: 0.65-0.85 (or about 0.65-about 0.85).

In some embodiments, the alloy can include, in wt. %:

Fe;
Cr: 14-35 (or about 14-about 35);
Mo+W: 0-15 (or about 0-about 15); and
B: 0.2-2.8 (or about 0.2-about 2.8).

In some embodiments, the alloy can include, in wt. %:

Fe;
Cr: 20-34 (or about 20-about 34);
Mo+W: 0-6 (or about 0-about 6);
B: 0.8-1.8 (or about 0.8-about 1.8); and
Nb+Ti: 1-4 (or about 1-about 4).

In some embodiments, the alloy can include, in wt. %:

Fe;
Cr: 15-30 (or about 15-about 30);
Mo+W: 0-6 (or about 0-about 6);
B: 0.2-1.0 (or about 0.2-about 1.0);
Nb+Ti: 5-12 (or about 5-about 12); and
C: 0.4-1.4 (or about 0.4-about 1.4).

In some embodiments, the alloy can include, in wt. %:

Fe;
Cr: 15-34 (or about 15-about 34);
Mo+W: 1-16 (or about 1-about 16);
B: 0.3-2.7 (or about 0.3-about 2.7);
Nb+Ti: 1-10 (or about 1-about 10); and
C: 0-1.2 (or about 0-about 1.2).

In some embodiments, the alloy can include, in wt. %

Fe;
Cr: 13.5-35 (or about 15-about 34);
B+C: 0.8-2 (or about 0.8-about 2); and
Nb+Ti+V: 0.5-8.5 (or about 0.5-about 8.5).

In some embodiments, the alloy can include, in wt. %:

Fe;
Cr: 13.6-34.8 (or about 13.6-about 34.8);
B+C: 0.8-1.92 (or about 0.8-about 1.92);
Mo+W: 0-2.4 (or about 0-about 2.4);
Ni: 0-1.6 (or about 0-about 1.6); and
Nb+Ti+V: 0.8-8.4 (or about 0.8-about 8.4).

In some embodiments, the alloy can include, in wt. %:

Fe;
C: 0.8-1.2 (or about 0.8-about 1.2);
B+C: 0.8-1.68 (or about 0.8-about 1.68);
Cr: 13.6-24 (or about 13.6-about 24);
Mo+W: 0-2.4 (or about 0-about 2.4);
Ni: 0-1.6 (or about 0-about 1.6);
Nb: 4-6 (or about 4-about 6);
Ti: 1.6-2.4 (or about 1.6-about 2.4); and
Nb+Ti+V: 4-8.4 (or about 4-about 8.4).

In any of the compositions disclosed herein, Mo+W may be greater than 1 wt. % (or greater than about 1 wt. %) or greater than 3 wt. % (or greater than about 3 wt. %).

In some embodiments, more preferably the alloy can include Mo+W in wt. % from 1.6 to 2.4 (or about 1.6 to about 2.4). In some embodiments, the alloy can include Mo in wt. % from 1.6 to 2.4 (or about 1.6 to about 2.4). In some embodiments, the alloy can include C in wt. % from 0.8 to 1.2 (or about 0.8 to about 1.2). In some embodiments, the alloy can include Cr in wt. % from 13.6 to 24 (or about 13.6 to about 24). In some embodiments, the alloy can include Nb in wt. % from 4 to 6 (or about 4 to about 6). In some embodiments, the alloy has a Nb/C ratio from 4 to 6 (or about 4 to about 6). In some embodiments, the alloy has a Nb/C ratio from 4.5 to 5.5 (or about 4.5 to about 5.5).

In any of the above embodiments, the alloy can include in wt. % B from 0.8 to 1.2 (or about 0.8 to about 1.2). In any of the above embodiments, the alloy can include in wt. % B from 0.3-0.5 (or about 0.3 to about 0.5). In some embodiments, the alloy can include in wt. % Ti from 1.6 to 2.4 (or about 1.6 to about 2.4).

In some embodiments, the disclosed compositions can be the wire/powder, the coating or other metallic component, or both.

In some embodiments alloys disclosed have chemistries altered by dilution with the substrate after deposition. In some embodiments the substrate dilution may be between 0 and 50 volume percent. Embodiments of the disclosure may be designed to handle dilution with substrates having high levels of carbon such as gray cast iron. For the composition, the carbon in the substrate wants to form deleterious phases that reduce Cr, Mo, and/or W content of the matrix, reducing corrosion performance and/or forming phases that reduce the toughness or wear performance of the alloy. As a result, embodiments of the disclosure can work undiluted, diluted with low carbon steel, and diluted with high carbon ferrous alloys such as gray cast iron while maintaining good properties in all cases.

In some embodiments, the alloy can include, in weight percent, less than 1% carbon (or less than about 1% carbon). In some embodiments, the alloy can include, in weight percent, less than 0.5% carbon (or less than about 0.5% carbon). In some embodiments, the alloy can include, in weight percent, less than 0.25% carbon (or less than about 0.25% carbon). In some embodiments, the alloy can include, in weight percent, less than 0.1% carbon (or less than about 0.1% carbon).

Because of regulatory, environmental, and safety concerns, nickel can be limited in all wear surfaces. Some embodiments of this disclosure specifically limit the nickel content of the feedstock powder.

In some embodiments, the alloy can include less than 5 wt. % nickel (or less than about 5 wt. % nickel). In some embodiments, the alloy can include less than 2 wt. % nickel (or less than about 2 wt. % nickel). In some embodiments, the alloy can include less than 1 wt. % nickel (or less than about 1 wt. % nickel). In some embodiments, the alloy can include less than 0.5 wt. % nickel (or less than about 0.5 wt. % nickel). In some embodiments, the alloy can include less than 0.2 wt. % nickel (or less than about 0.2 wt. % nickel). In some embodiments, the alloy can include less than 0.15 wt. % nickel (or less than about 0.15 wt. % nickel). In some embodiments, alloy can include less than 0.1 wt. % nickel (or less than about 0.1 wt. % nickel).

Table 1 shows some embodiments of chemistries of arc melted alloys. Table 2 shows embodiments of chemistries for laser cladding.

TABLE 1

Nominal Chemistries of Alloys Manufactured via Arc Melting

| B | C | Cr | Fe | Mo | Nb | Ti |
|---|---|----|----|----|----|----|
| 1.4 | 0 | 27 | 70.6 | 0 | 1 | 0 |
| 1.8 | 0 | 17 | 72.2 | 9 | 0 | 0 |
| 2.4 | 0 | 29 | 65.6 | 2 | 1 | 0 |
| 2.6 | 0 | 17 | 67.4 | 12 | 1 | 0 |

TABLE 1-continued

Nominal Chemistries of Alloys Manufactured via Arc Melting

| B | C | Cr | Fe | Mo | Nb | Ti |
|---|---|----|----|----|----|----|
| 2.6 | 0 | 17 | 64.4 | 15 | 1 | 0 |
| 2.8 | 0 | 27 | 67.2 | 2 | 1 | 0 |
| 2.2 | 0 | 31 | 62.8 | 2 | 2 | 0 |
| 2.6 | 0 | 20 | 60.4 | 15 | 2 | 0 |
| 1.6 | 0 | 29 | 64.4 | 4 | 1 | 0 |
| 2 | 0 | 32 | 62 | 3 | 1 | 0 |
| 0.4 | 1 | 20 | BAL | 2 | 8 | 0 |
| 0.4 | 1 | 20 | BAL | 2 | 5 | 2 |
| 0 | 1 | 20 | BAL | 2 | 5 | 2 |

TABLE 2

Measured chemistry of alloys manufactured into powder for laser cladding

| Cr | Nb | Mo | B | C | Ti | Fe |
|----|----|----|---|---|----|----|
| 26.5 | 2.0 | 1.0 | 1.50 | 0.07 | N/A | Bal |
| 28.6 | 2.0 | 4.0 | 1.55 | 0.07 | N/A | Bal |
| 20.1 | 5.6 | 2.1 | 0.44 | 0.81 | 1.6 | Bal |

In some embodiments, titanium can be reduced through the increased in Nb or the inclusion of V. An example composition is Fe: Bal, C: 1, Cr: 20, Mo: 2, Nb: 5, Ti: 1.6, V: 4.8 (or Fe: Bal, C: about 1, Cr: about 20, Mo: about 2, Nb: about 5, Ti: about 1.6, V: about 4.8) which has Nb+Ti+V=11.4 (or about 11.4).

TABLE 3

Example Chemistry Ranges

| B (min/max) | C (min/max) | Cr (min/max) | Mo (min/max) | Ni (min/max) | Nb (min/max) | Ti (min/max) | Fe (min/max) |
|-------------|-------------|--------------|--------------|--------------|--------------|--------------|--------------|
| | 0.8/1.2 | 13.6/20.4 | | 1.2/1.6 | 4/6 | | Bal |
| | 0.9/1.1 | 15.3/18.7 | | | 4.5/5.5 | | Bal |
| | 0.8/1.2 | 16/24 | | | 4/6 | | Bal |
| | 0.9/1.1 | 18/22 | | | 4.5/5.5 | | Bal |
| 0.32/0.48 | 0.8/1.2 | 16/24 | 1.6/2.4 | | 4/6 | 1.6/2.4 | Bal |
| 0.36/0.44 | 0.9/1.1 | 18/22 | 1.8/2.2 | | 4.5/5.5 | 1.8/2.2 | Bal |
| 1.12/1.92 | | 21.6/34.8 | | | 0.8/1.2 | | Bal |
| 1.26/1.76 | | 24.3/31.9 | | | 0.9/1.1 | | Bal |

TABLE 4

Example Chemistry Ranges

| B (min/max) | C (min/max) | Cr (min/max) | Mo (min/max) | Ni (min/max) | Nb (min/max) | Ti (min/max) | Fe (min/max) |
|-------------|-------------|--------------|--------------|--------------|--------------|--------------|--------------|
| | 0.8/1.2 | 13.6/20.4 | | 1.2/1.6 | 4/6 | | Bal |
| | 0.9/1.1 | 15.3/18.7 | | | 4.5/5.5 | | Bal |
| | 0.8/1.2 | 16/24 | | | 4/6 | | Bal |
| | 0.9/1.1 | 18/22 | | | 4.5/5.5 | | Bal |
| 0.32/0.48 | 0.8/1.2 | 16/24 | 1.6/2.4 | | 4/6 | 1.6/2.4 | Bal |
| 0.36/0.44 | 0.9/1.1 | 18/22 | 1.8/2.2 | | 4.5/5.5 | 1.8/2.2 | Bal |

The disclosed alloys can incorporate the above elemental constituents to a total of 100 wt. %. In some embodiments, the alloy may include, may be limited to, or may consist essentially of the above named elements. In some embodiments, the alloy may include 2 wt. % (or about 2 wt. %) or less, 1 wt. % (or about 1 wt. %) or less, 0.5 wt. % (or about 0.5 wt. %) or less, 0.1 wt. % (or about 0.1 wt. %) or less or 0.01 wt. % (or about 0.01 wt. %) or less of impurities, or any range between any of these values. Impurities may be understood as elements or compositions that may be included in the alloys due to inclusion in the feedstock components, through introduction in the manufacturing process. In some embodiments, an impurity may be Co, Mn, Mo, Ta, V, and/or W.

Further, the Fe content identified in all of the compositions described in the above paragraphs may be the balance of the composition as indicated above, or alternatively, where Fe is provided as the balance, the balance of the composition may comprise Fe and other elements. In some embodiments, the balance may consist essentially of Fe and may include incidental impurities.

Thermodynamic Criteria

In some embodiments, alloys can be fully characterized by their thermodynamic criteria.

The hardness of embodiments of the alloy can be maintained at a relatively low level by designing for a stable ferrite phase. In most iron-based alloys, austenite is present at high temperatures. Upon sufficiently fast cooling rates, austenite transforms to martensite. Martensite is present in almost all hardfacing alloys as it is the hardest metallic iron phase. However, it is possible, given sufficiently low cooling rates, for an alloy which is classified as a "martensitic steel" to form ferrite. Typical laser cladding conditions are sufficiently rapid such that martensite will typically form in many iron alloys, 431 stainless steel being a relevant example. The alloy technology described herein will not form martensite, even under rapid cooling conditions, as the ferritic structure is thermodynamically stable at high temperatures and that stability extends to low temperatures. Thus, in some embodiments the alloy will form only a ferritic matrix with hard phases.

Figure 1:
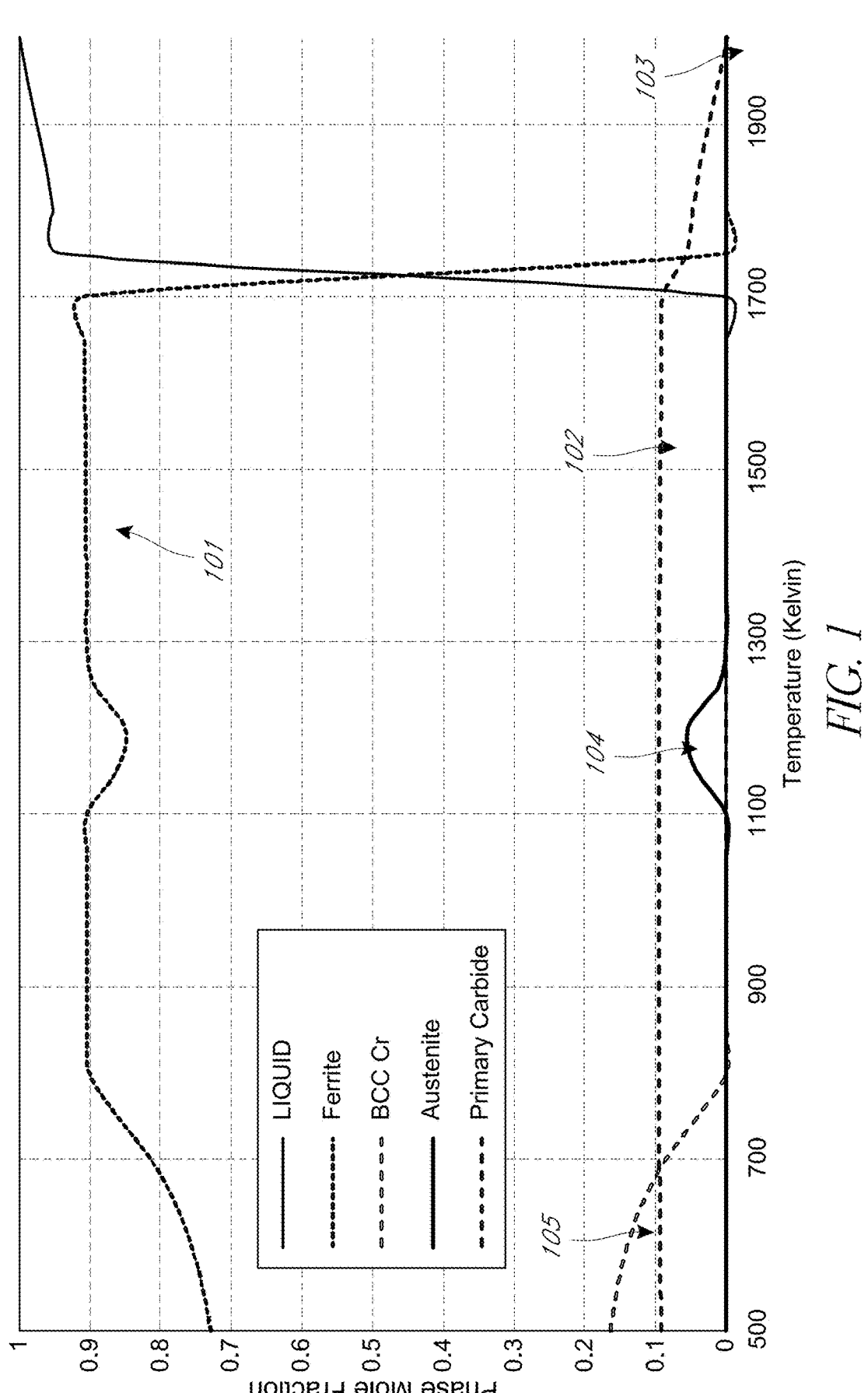
FIG. 1 shows an embodiment of a thermodynamic profile of an alloy of the disclosure.

An example of the stability of the ferrite phase is shown in FIG. 1, which shows a thermodynamic calculation for an alloy of the disclosure. This diagram plots the phase mole fraction as a function of temperature for a given composition. As shown the ferrite phase is present at 90 mol. % at elevated temperatures just below the solidus temperature of the alloy. The ferrite phase is consistently present in excess of 70 mol. % down to a lower temperature of 500K. Some austenite [104] and BCC Cr [105] are also present through this temperature range, but the majority of the phase composition is ferrite over the entire temperature window. In FIG. 1, [101] shows the formation of a ferritic (BCC) matrix that is stable across the entire temperature range and [102] is showing the formation of a Nb/Ti carbide hard phase at roughly 10% volume fraction. Under such conditions, the alloy will form ferrite under a variety of welding conditions even those with rapid cooling rates which tend to form martensite in iron based alloys. Processes which exhibit rapid cooling conditions include thermal spray, plasma transfer arc (PTA) welding, laser cladding, and ultra-high speed laser cladding (EHLA).

Figure 2:
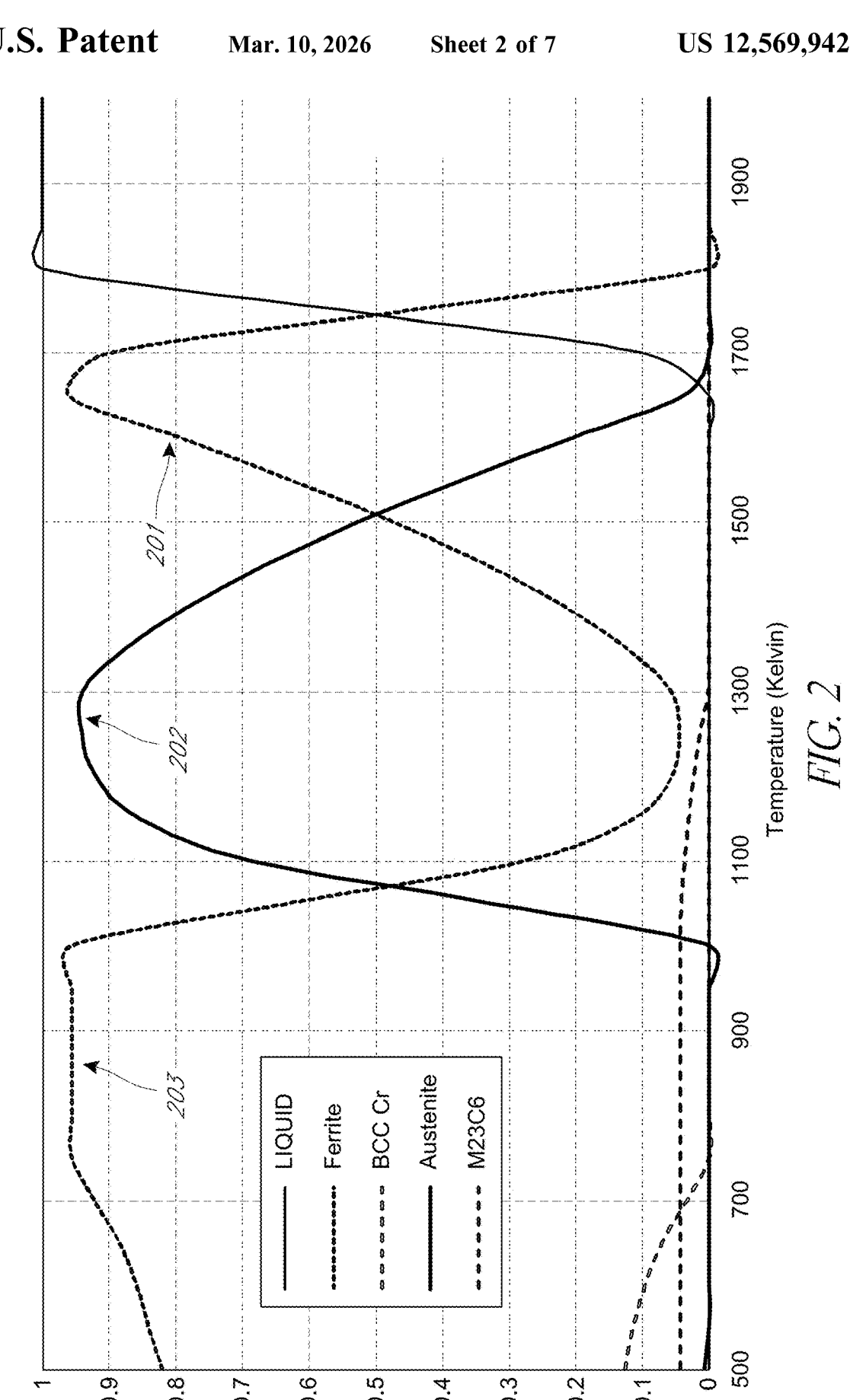
FIG. 2 shows a thermodynamic profile of 431 stainless steel.

In comparison, a thermodynamic profile for 431 stainless steel, a common hardfacing alloy used for hydraulic rod applications, is shown in FIG. 2. Contrasting with the alloy of FIG. 1, 431 stainless steel forms delta ferrite [201] at high temperatures, which transitions to austenite [202] at lower temperatures, and then back to alpha ferrite [203] upon further cooling. 431 stainless steel will form ferrite, austenite, martensite, or some mixture depending on the cooling rate of the process. 431 stainless is generally intended to form martensite in application providing high hardness for hardfacing applications. 431 stainless can be made to form a ferritic structure under controlled slow cooling conditions or via heat treatment, but it will not form a ferritic structure under relevant fast cooling process such as PTA welding. Alloys of this disclosure are different in the ferrite formation behavior, in that ferrite forms in even under rapid cooling conditions. This behavior is advantageous when it is desired to form a low hardness coating via such processes.

In some embodiments, at all temperatures below the solidus and above 500K, the ferrite phase fraction is 50 (or about 50) mol. % or higher. In some embodiments, the ferrite phase fraction is 60 (or about 60) mol. % or higher. In some embodiments, the ferrite phase fraction is 70 (or about 70) mol. % or higher. For reference the alloy of the disclosure reaches a minimum of 72.9 mol. % within the prescribed temperature window. 431 stainless steel reaches a minimum 4.47 mol. % of ferrite.

In some embodiments, the alloy matrix can be 100% ferritic at 1300K (or about 100%). In some embodiments, the alloy matrix can be greater than 95% ferritic at 1300K (or greater than about 95%). In some embodiments, the alloy matrix can be greater than 90% ferritic at 1300K (or greater than about 90%). In some embodiments, the alloy matrix can be greater than 80% ferritic at 1300K (or greater than about 80%). This ferritic matrix can be maintained in the coating microstructure.

In some embodiments there can be 0 mol. % (or about 0 mol. %) FCC austenite present between 1000 and 1400K (or about 1000 and about 1400K). In some embodiments the maximum mole fraction of FCC austenite present between 1000 and 1400K (or about 1000 and about 1400K) is less than 5 mol. % (or less than about 5 mol. %). In some embodiments the maximum mole fraction of FCC austenite present between 1000 and 1400K (or about 1000 and about 1400K) is less than 10 mol. % (or less than about 10 mol. %). In some embodiments the maximum mole fraction of FCC austenite present between 1000 and 1400K (or about 1000 and about 1400K) is less than 15 mol. % (or less than about 15 mol. %).

In some embodiments of this disclosure, the alloy matrix chemistry at 1300 k falls within the ferrite region of the Schaeffler diagram, shown in FIG. 8. In some embodiments of this disclosure, the alloy matrix chemistry at 1300 k falls within the ferrite region or ferrite plus martensite are of the Schaeffler diagram. In some embodiments of this disclosure the alloy matrix chemistry at 1300 k is not in the austenite, austenite plus martensite, or martensitic region of the Schaeffler diagram.

A second feature of alloys of the disclosure is the formation of primary FCC carbides, also known as MC type carbides. Such carbides can provide the enhanced abrasion resistance desired in application despite the low hardness. In FIG. 1 the thermodynamic behavior of the FCC carbides is shown, where they form at relatively high temperatures [103] and ultimately form at ~10 mol. % in the alloy of the disclosure. In some aspects, it can be advantageous for the carbide formation temperature to be high. This encourages the morphology of the carbides to form an isolated and spherical morphology. Such a morphology provides abrasion resistance but does not drastically decrease the toughness of the coating. However, the formation temperature may not be driven too high as it will make the alloy incompatible with industrial gas atomization processes. The balance of maximizing formation temperature for idealized structure while minimizing it to avoid atomization difficulties was determined through the course of inventive effort.

In some embodiments, the primary carbide formation temperature can be between 1750 K and 2100 K (or between about 1750 K and about 2100 K). In some embodiments, the primary carbide formation temperature can be between 1850 K and 2000 K (or between about 1850 K and about 2000K).

In some embodiments, the primary carbide mole fraction measure at 1300K can be 5 (or about 5) mol. % or higher. In some embodiments, the primary carbide mole fraction measure at 1300K can be 7.5 (or about 7.5) mol. % or higher. In some embodiments, the primary carbide mole fraction measure at 1300K can be 10 (or about 10) mol. % or higher. For reference the alloy of the disclosure forms 9.6 mol. % primary carbide fraction and the formation temperature the primary carbide is 2000K. 431 stainless steel forms no primary carbides.

In some embodiments the mole fraction of MC carbides under equilibrium or near equilibrium solidification conditions can be between 1% and 15% (or between about 1% and about 15%). In some embodiments the mole fraction of MC carbides under equilibrium or near equilibrium solidification conditions can be between 1% and 6% (or between about 1% and about 6%). In some embodiments the mole fraction of MC carbides under equilibrium or near equilibrium solidification conditions can be between 5% and 15% (or between about 5% and about 15%). In some embodiments the mole fraction of MC carbides under equilibrium or near equilibrium solidification conditions can be between 7% and 12% (or about 7% and about 12%).

The primary carbides of the alloy of the disclosure can contain Nb and Ti as the metallic species. It is possible to form FCC primary carbides with Nb, Ti, V, or any combination thereof. However, the ratio of such metallic species effects the formation temperature. Accordingly, in some embodiments instead of forming niobium carbide, which has a very high formation temperature, other FCC carbide formers, such as titanium, can be added to lower the formation temperature of the carbide.

The thermodynamics of the alloy technology yield the advantageous microstructure as shown in FIG. 3 with a ferritic matrix [301] with embedded primary carbides [302]. FIG. 3 shows a PTA coating of the alloy of the disclosure using parameters described later in the disclosure. Energy dispersive spectroscopy was used to measure the composition of the ferritic matrix itself, particularly with an interest on the chromium content. The Cr content was measured at 19 wt. % in the PTA coating. It is generally advantageous to have a high Cr content in the ferrite matrix to provide elevated corrosion resistance.

In some embodiments, the Cr content of the ferrite matrix can be at least 12 (or at least about) wt. %. In some embodiments, the Cr content of the ferrite matrix can be at least 15 (or about 15) wt. %. In some embodiments, the Cr content of the ferrite matrix can be at least 19 (or about 19) wt. %. It should be noted that ferrite matrix content is often different from the alloy Cr composition, and Cr in the form of Cr carbides or other phases do not enhance to the corrosion resistance of the alloy.

Corrosion performance of ferrous alloys can be predicted with a pitting resistance equivalent number (PREN). This number is calculated as PREN=Cr+3.3*(Mo+0.5*W)+16*N, where the elemental values are in weight percent. In typical single phase materials, such as most ferritic stainless steels, this number is applied to the bulk alloy composition.

Because alloys in this disclosure contain multiple phases, the PREN number can be calculated based on the equilibrium thermodynamic condition of the matrix phase, intentionally excluding the composition of other phases that form, such as borides. The matrix phase is defined as the FCC or BCC iron rich metallic phase. This allows the matrix PREN value to accurately predict the relative corrosion performance of multi-phase materials. In some embodiments of this disclosure the matrix phase is BCC ferrite.

As shown in FIG. 4, the alloy of the disclosure the matrix PREN is calculated as 34.3 at 1300K [401] based on the chemistry of the BCC phase, the only matrix phase present under equilibrium solidification conditions. In an alloy of the disclosure, shown in FIG. 5, the matrix PREN is calculated as 27.0 at 1300K [501] based on the chemistry of the BCC phase. See Table 5 below for all alloys produced via arc melting and their calculated PREN at 1300K under equilibrium solidification conditions.

In some embodiments of this disclosure, the matrix PREN at 1300K is greater than 17 (or greater than about 17). In some embodiments of this disclosure, the matrix PREN at 1300K is greater than 20 (or greater than about 20). In some embodiments of this disclosure, the matrix PREN at 1300K is greater than 23 (or greater than about 23). In some embodiments of this disclosure, the matrix PREN at 1300K is greater than 25 (or greater than about 25).

Another way of predicting the corrosion performance of a ferrous alloy is by the chromium content. The chromium content can be calculated for the matrix phase under equilibrium solidification conditions, and is further shown in Table 5.

In some embodiments at 1300K the matrix can include, in weight percent, greater than 13% chromium (or greater than about 13%). In some embodiments at 1300K, the matrix can include, in weight percent, greater than 15% chromium (or greater than about 15%). In some embodiments at 1300K, the matrix can include, in weight percent, greater than 17% chromium (or greater than about 17%). In some embodiments at 1300K, the matrix can include, in weight percent, greater than 18% chromium (or greater than about 18%). In some embodiments at 1300K, the matrix can include, in weight percent, greater than 20% chromium (or greater than about 20%). In some embodiments, the chromium discussed herein can be in the final coating.

The formation of intermetallic phases in high Cr, Mo, and/or W stainless can result in high fractions of intermetallic phases correlated with reduced toughness and/or ductility. As this alloys is configured to have minimal to no cracking after deposition via thermal spray or other process, it can be advantageous to minimize the presence of any embrittling phases. In this disclosure, intermetallic phase mole fraction is defined as the sum under equilibrium solidification conditions of all chi, sigma, and laves phases. In some applications such as brake discs, the surface may reach 800K during extreme braking events, as a result it is critical that intermetallic phases do not precipitate out in service.

As shown in FIG. 4, in the alloy of the disclosure intermetallic phases present at 800K are a sigma phase [402] and a laves phase [403] so the intermetallic mole phase fraction at 800K is calculated as 18.5%. FIG. 5 shows that in the alloy of the disclosure there is both a laves phase [502] and sigma phase [503] so the total calculated mole fraction is 8.6%.

In some embodiments at 800K, the alloy can include, in mole percent, less than 25% (or less than about 25%) intermetallic phases. In some embodiments at 800K the alloy can include, in mole percent, less than 20% (or less than about 20%) intermetallic phases. In some embodiments at 800K the alloy can include, in mole percent, less than 15% (or less than about 15%) intermetallic phases. In some embodiments at 800K the alloy can include, in mole percent, less than 10% (or less than about 10%) intermetallic phases. In some embodiments at 800K the alloy can include, in mole percent, less than 8% (or less than about 8%) intermetallic phases.

The formation of hard phases such as borides, carbides, borocarbides, oxides, and nitrides can improve the wear resistance of an alloy. There are practical limits to the fraction of hard phases where excessively high values may lead to the alloy cracking after deposition or in service, especially when exposed to cyclical and rapid changes in temperature. Hard phases in this disclosure can be calculated as the sum of all borides, carbides, borocarbides, oxides, and/or nitrides under equilibrium solidification conditions.

In the alloy of the disclosure there are two hard phases present at 1300K, an $M_3B_2$ phase [405] and an $M_2B$ phase [404], the sum of these hard phases is 21.7 mol %. In the alloy of the disclosure the hard phases present are $M_2B$ [504] and MC carbide (FCC_A1 #2) [505] so the mole fraction of hard phases at 1300K is 15.1%.

In some embodiments of this disclosure the mole fraction of hard phases under equilibrium or near equilibrium solidification conditions can be between 7 and 35% (or about 7 and about 35%). In some embodiments of this disclosure the mole fraction of hard phases can be between 7 and 25% (or about 7 and about 25%). In some embodiments of this disclosure the mole fraction of hard phases can be between 10 and 22% (or about 10 and about 22%). In some embodiments of this disclosure the mole fraction of hard phases can be between 7 and 22% (or about 7 and about 22%).

In some embodiments borides can advantageously form due to the low solid solution solubility of boron in iron which improves precipitation of certain phases during rapid cooling rates such as those present in laser cladding and EHLA processes.

In some embodiments, the hard phases may be only borides, or a combination of borides and carbides.

In some embodiments the mole fraction of borides under equilibrium or near equilibrium solidification conditions can be between 2% and 25% (or about 2% and about 25%). In some embodiments the mole fraction of borides under equilibrium or near equilibrium solidification conditions can be between 2% and 10% (or about 2% and about 10%). In some embodiments the mole fraction of borides under equilibrium or near equilibrium solidification conditions can be between 2% and 6% (or about 2% and about 6%). In some embodiments the mole fraction of borides under equilibrium or near equilibrium solidification conditions can be between 8% and 24% (or about 8% and about 24%). In some embodiments the mole fraction of borides under equilibrium or near equilibrium solidification conditions can be between 8% and 16% (or about 8% and about 16%). In some embodiments the mole fraction of borides under equilibrium or near equilibrium solidification conditions can be between 10% and 22% (or about 10% and about 22%).

In some embodiments, MC type carbides, where M comprises Nb and/or Ti, are can advantageously form due to their advantageous low aspect ratio and isolated morphology. This morphology can have relatively high crack resistance compared to hypo eutectic or eutectic morphologies present for other carbides and other hard phases.

In some embodiments the mole fraction of MC carbides under equilibrium or near equilibrium solidification conditions can be between 1% and 15% (or between about 1% and about 15%). In some embodiments the mole fraction of MC carbides under equilibrium or near equilibrium solidification conditions can be between 1% and 6% (or between about 1% and about 6%). In some embodiments the mole fraction of MC carbides under equilibrium or near equilibrium solidification conditions can be between 5% and 15% (or between about 5% and about 15%). In some embodiments the mole fraction of MC carbides under equilibrium or near equilibrium solidification conditions can be between 7% and 12% (or about 7% and about 12%).

The formation of high temperature phases during melting and atomization may reduce the manufacturability of an alloy by limiting fluidity. Limited fluidity may require special equipment to melt, may reduce the yield of atomization, and/or render production impossible on an industrial scale. To ensure high fluidity the liquidus temperature under equilibrium solidification conditions can be controlled as low liquidus temperature correlates to improved fluidity during atomization.

Liquidus temperature is defined thermodynamically as the lowest temperature where the alloy is 100% liquid. In an alloy of the disclosure the liquidus temperature is 1950 [506] and another alloy of the disclosure the liquidus temperature is 1650K [406].

In some embodiments, the liquidus temperature of the alloy can be less than 2000K (or less than about 2000K). In some embodiments, the liquidus temperature of the alloy can be less than 1975K (or less than about 1975K). In some embodiments, the liquidus temperature of the alloy can be less than 1950K (or less than about 1950K). In some embodiments, the liquidus temperature of the alloy can be less than 1925K (or less than about 1925K). In some embodiments, the liquidus temperature of the alloy can be less than 1900K (or less than about 1900K).

In some embodiments of this disclosure it can be advantageous to have a ferritic matrix. In the alloys, the matrix is 100% ferritic (BCC) at 1300K and the composition falls within the ferrite zone on a Schaeffer diagram.

In some embodiments of this disclosure alloy matrix can be 100% ferritic at 1300K (or about 100%). In some embodiments of this disclosure alloy matrix can be greater than 95% ferritic at 1300K (or greater than about 95%). In some embodiments of this disclosure alloy matrix can be greater than 90% ferritic at 1300K (or greater than about 90%). In some embodiments of this disclosure alloy matrix can be greater than 80% ferritic at 1300K (or greater than about 80%). This ferritic matrix can be maintained in the coating microstructure.

In some embodiments there can be 0 mol. % (or about 0 mol. %) FCC austenite present between 1000 and 1400K (or about 1000 and about 1400K). In some embodiments the maximum mole fraction of FCC austenite present between 1000 and 1400K (or about 1000 and about 1400K) is less than 5 mol. % (or less than about 5 mol. %). In some embodiments the maximum mole fraction of FCC austenite present between 1000 and 1400K (or about 1000 and about 1400K) is less than 10 mol. % (or less than about 10 mol. %). In some embodiments the maximum mole fraction of FCC austenite present between 1000 and 1400K (or about 1000 and about 1400K) is less than 15 mol. % (or less than about 15 mol. %).

In some embodiments of this disclosure, the alloy matrix chemistry at 1300 k falls within the ferrite region of the Schaeffler diagram, shown in FIG. 8. In some embodiments of this disclosure, the alloy matrix chemistry at 1300 k falls within the ferrite region or ferrite plus martensite are of the Schaeffler diagram. In some embodiments of this disclosure the alloy matrix chemistry at 1300 k is not in the austenite, austenite plus martensite, or martensitic region of the Schaeffler diagram.

In some embodiments, alloys of this disclosure have matrix PREN values at 1300K greater than 23 (or about 23) and a matrix with greater than 90% (or about 90%) ferrite at 1300K, after the addition of less than or equal to 0.30% (or

TABLE 5

| | | | | | | | | | |
|---|---|---|---|---|---|---|---|---|---|
| | | | | 1300 K | Total | | | | |
| Calculated | M3B2 | M2B | MC | Hard | Boride | Matrix | Liquidus | | |
| PREN | mol % | mol % | mol % | Phase | at | Cr at | Temp in | 800 K | Measured |
| 1300 K | 1300 K | 1300 K | 1300 K | mol % | 1300 K | 1300 k | K | intermetallic | PREN |
| 23.0 | 0.0% | 19.0% | 0.0% | 19.0% | 19.0% | 23.0% | 1650 | 7.50% | 23.5 |
| 20.8 | 16.3% | 7.0% | 0.0% | 23.3% | 23.3% | 15.0% | 1600 | 7.10% | 28.7 |
| 26.6 | 0.0% | 32.4% | 0.0% | 32.4% | 32.4% | 22.0% | 1650 | 4.30% | 24.4 |
| 20.0 | 23.0% | 8.9% | 0.0% | 31.9% | 31.9% | 14.4% | 1650 | 7.50% | 18.8 |
| 23.3 | 30.0% | 0.9% | 0.0% | 30.9% | 30.9% | 16.9% | 1650 | 11.10% | 25.0 |
| 22.3 | 0.0% | 37.4% | 0.0% | 37.4% | 37.4% | 17.9% | 1700 | 4.10% | 21.4 |
| 30.9 | 0.0% | 28.3% | 0.0% | 28.3% | 28.3% | 26.0% | 1650 | 14.20% | 29.8 |
| 29.3 | 29.2% | 0.4% | 0.0% | 29.6% | 29.6% | 21.6% | 1700 | 18.00% | 31.7 |
| 34.3 | 1.7% | 20.0% | 0.0% | 21.7% | 21.7% | 25.6% | 1650 | 18.50% | 36.34 |
| 34.7 | 0.0% | 27.3% | 0.0% | 27.3% | 27.3% | 27.2% | 1600 | 19.80% | 34.59 |
| 27.2 | 0.0% | 5.9% | 9.5% | 15.4% | 5.9% | 20.5% | 1850 | 6.00% | |
| 27.0 | 0.0% | 6.0% | 9.1% | 15.1% | 6.0% | 20.3% | 1950 | 8.60% | |

Post Dilution Thermodynamics

Where alloys of this disclosure can be deposited on substrates comprising high levels of carbon, such as gray cast iron or nodular cast iron, it can be advantageous to maintain good properties after dilution and corresponding carbon content increase in the overlay. A ferritic structure has advantages in certain applications where austenite would increase galling and/or martensite would present cracking and/or toughness issues. Certain embodiments of this disclosure also describe maintaining a ferritic structure after dilution with a substrate. This substrate may be a mild steel, HSLA steel, cast iron, nodular iron, white iron, or other iron based substrate.

In some embodiments, alloys of this disclosure have matrix PREN values at 1300K greater than 23 (or about 23) and a matrix with greater than 90% (or about 90%) ferrite at 1300K, after the addition of less than or equal to 0.15% (or about 0.15%) carbon from substrate dilution. In some embodiments, alloys of this disclosure have matrix PREN values at 1300K greater than 20 (or about 20) and a matrix with greater than 90% (or about 90%) ferrite at 1300K, after the addition less than or equal to 0.15% (or about 0.15%) carbon from substrate dilution.

In some embodiments, alloys of this disclosure have matrix PREN values at 1300K greater than 23 (or about 23) and a matrix with greater than 90% (or about 90%) ferrite at 1300K, after the addition of less than or equal to 0.20% (or about 0.20%) carbon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.20% (or about 0.20%) carbon from substrate dilution.

In some embodiments, alloys of this disclosure have matrix PREN values at 1300K greater than 23 (or about 23) and a matrix with greater than 90% (or about 90%) ferrite at 1300K, after the addition of less than or equal to 0.25% (or about 0.25%) carbon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.25% (or about 0.25%) carbon from substrate dilution.

about 0.30%) carbon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.30% (or about 0.30%) carbon from substrate dilution.

In some embodiments, alloys of this disclosure have matrix PREN values at 1300K greater than 20 (or about 20) and a matrix with greater than 90% (or about 90%) ferrite at 1300K, after the addition of less than or equal to 0.35% (or about 0.35%) carbon from substrate dilution. In some embodiments, alloys of this disclosure have matrix PREN values at 1300K greater than 23 (or about 23) and a matrix with greater than 90% (or about 90%) ferrite at 1300K, after the addition of less than or equal to 0.35% (or about 0.35%) carbon from substrate dilution. In some embodiments, alloys of this disclosure have matrix PREN values at 1300K greater than 17 (or about 17) and a matrix with greater than 90% (or about 90%) ferrite at 1300K, after the addition of less than or equal to 0.35% (or about 0.35%) carbon from substrate dilution.

Where alloys of this disclosure are deposited on substrates comprising high levels of carbon and silicon, such as gray cast iron or nodular cast iron, it can be advantageous to maintain good corrosion properties after dilution and corresponding carbon content increase in the overlay.

In some embodiments, alloys of this disclosure have matrix PREN values at 1300K greater than 23 (or about 23) and a matrix with greater than 90% (or about 90%) ferrite at 1300K, after the addition of less than or equal to 0.15% (or about 0.15%) carbon and silicon from substrate dilution. In some embodiments, alloys of this disclosure have matrix PREN values at 1300K greater than 20 (or about 20) and a matrix with greater than 90% (or about 90%) ferrite at 1300K, after the addition less than or equal to 0.15% (or about 0.15%) carbon and silicon from substrate dilution.

In some embodiments, alloys of this disclosure have matrix PREN values at 1300K greater than 23 (or about 23) and a matrix with greater than 90% (or about 90%) ferrite at 1300K, after the addition of less than or equal to 0.20% (or about 0.20%) carbon and silicon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.20% (or about 0.20%) carbon and silicon from substrate dilution.

In some embodiments, alloys of this disclosure have matrix PREN values at 1300K greater than 23 (or about 23) and a matrix with greater than 90% (or about 90%) ferrite at 1300K, after the addition of less than or equal to 0.25% (or about 0.25%) carbon and silicon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.25% (or about 0.25%) carbon and silicon from substrate dilution.

In some embodiments, alloys of this disclosure have matrix PREN values at 1300K greater than 23 (or about 23) and a matrix with greater than 90% (or about 90%) ferrite at 1300K, after the addition of less than or equal to 0.30% (or about 0.30%) carbon and silicon from substrate dilution. In some embodiments, alloys of this disclosure have matrix PREN values at 1300K greater than 20 (or about 20) and a matrix with greater than 90% (or about 90%) ferrite at 1300K, after the addition of less than or equal to 0.30% (or about 0.30%) carbon and silicon from substrate dilution.

In some embodiments, alloys of this disclosure have matrix PREN values at 1300K greater than 20 (or about 20) and a matrix with greater than 90% (or about 90%) ferrite at 1300K, after the addition of less than or equal to 0.35% (or about 0.35%) carbon and silicon from substrate dilution. In some embodiments, alloys of this disclosure have matrix PREN values at 1300K greater than 23 (or about 23) and a matrix with greater than 90% (or about 90%) ferrite at 1300K, after the addition of less than or equal to 0.35% (or about 0.35%) carbon and silicon from substrate dilution. In some embodiments, alloys of this disclosure have matrix PREN values at 1300K greater than 17 (or about 17) and a matrix with greater than 90% (or about 90%) ferrite at 1300K, after the addition of less than or equal to 0.35% (or about 0.35%) carbon and silicon from substrate dilution.

In some embodiments of this disclosure, high levels of Nb and/or Ti can be present in the alloy. When alloys of this disclosure are clad on high carbon substrates such as gray iron, the Nb and/or Ti can bind to a portion of the carbon added via dilution with the substrate. This can result in an increased fraction of MC carbide where M comprises Nb and/or Ti compared to the same level of dilution with a low carbon substrate. This MC phase formation can reduce the weight percent of carbon in the matrix, improving the stability of ferrite and leading to beneficial properties. Also suppressed are carbides comprising chromium such as $M_7C_3$ and $M_{23}C_6$ which would reduce the PREN after deposition on high carbon substrates.

In some embodiments of this disclosure, the mole fraction MC after diluting with gray iron can be higher than would be present given the same weight fraction of dilution with low carbon steel.

In some embodiments the mole fraction of the sum of $M_7C_3$ and $M_{23}C_6$ at 1300 k is 0% (or about 0%). In some embodiments the mole fraction of the sum of $M_7C_3$ and $M_{23}C_6$ at 1300 k less than 2% (or about 2%). In some embodiments the mole fraction of the sum of $M_7C_3$ and $M_{23}C_6$ at 1300 k less than 5% (or about 5%).

TABLE 6

Thermodynamics of manufactured alloys after dilution with gray iron (in weight percent: 3.8% C, 1.9% Si, 0.2% Ni, 0.3% Cr, Balance Fe), Total Hard 1300 K, Austenite @ 1300 K, and M236 + M7C3 @ 1300 K are provided in mole fraction.

| Weight Percent Gray Iron | Carbon wt % | Silicon wt % | Ferrite PREN @ 1300 K | Schaeffler of Matrix @ 1300 K | Total Hard 1300 K | Austenite @ 1300 K | M23C6 + M7C3 @ 1300 K |
|---|---|---|---|---|---|---|---|
| 1% | 0.11% | 0.02% | 25 | Ferrite | 22.2% | 0% | 0.0% |
| 2% | 0.14% | 0.04% | 24.5 | Ferrite | 22.4% | 0% | 0.0% |
| 3% | 0.18% | 0.06% | 24 | Ferrite | 22.6% | 0% | 0.0% |
| 4% | 0.22% | 0.08% | 23.7 | Ferrite | 22.7% | 0% | 0.0% |
| 5% | 0.26% | 0.10% | 23.5 | Ferrite | 22.6% | 0% | 0.0% |
| 6% | 0.29% | 0.11% | 23.1 | Ferrite | 22.6% | 0% | 0.0% |
| 7% | 0.33% | 0.13% | 22.5 | Ferrite | 23.1% | 0% | 1.0% |
| 8% | 0.37% | 0.15% | 21.8 | Ferrite | 23.7% | 0% | 1.9% |
| 9% | 0.41% | 0.17% | 21 | Ferrite | 24.3% | 0% | 2.7% |
| 10% | 0.44% | 0.19% | 20.5 | Ferrite | 24.9% | 0% | 3.6% |
| 1% | 0.11% | 0.02% | 34 | Ferrite | 22.7% | 0% | 0.0% |
| 2% | 0.14% | 0.04% | 33.4 | Ferrite | 22.9% | 0% | 0.0% |
| 3% | 0.18% | 0.06% | 32.8 | Ferrite | 23.1% | 0% | 0.0% |
| 4% | 0.22% | 0.08% | 32.4 | Ferrite | 23.2% | 0% | 0.0% |
| 5% | 0.26% | 0.10% | 32 | Ferrite | 23.0% | 0% | 0.0% |
| 6% | 0.29% | 0.11% | 31.3 | Ferrite | 23.3% | 0% | 0.50% |
| 7% | 0.33% | 0.13% | 30.5 | Ferrite | 23.8% | 0% | 1.3% |
| 8% | 0.37% | 0.15% | 29.6 | Ferrite | 24.4% | 0% | 2.1% |
| 9% | 0.41% | 0.17% | 28.8 | Ferrite | 25.0% | 0% | 2.9% |
| 10% | 0.44% | 0.19% | 28 | Ferrite | 25.5% | 0% | 3.7% |
| 1% | 0.84% | 0.02% | 27.4 | Ferrite | 14.4% | 0% | 0.0% |
| 2% | 0.87% | 0.04% | 26.9 | Ferrite | 14.7% | 0% | 0.0% |
| 3% | 0.90% | 0.06% | 26.4 | Ferrite | 15.0% | 0% | 0.0% |
| 4% | 0.93% | 0.08% | 26 | Ferrite | 15.2% | 0% | 0.0% |
| 5% | 0.96% | 0.10% | 25.8 | Ferrite | 15.2% | 0% | 0.0% |
| 6% | 0.99% | 0.11% | 25.4 | Ferrite | 15.2% | 0% | 0.0% |
| 7% | 1.02% | 0.13% | 25.1 | Ferrite | 15.2% | 0% | 0.0% |
| 8% | 1.05% | 0.15% | 24.8 | Ferrite | 15.1% | 0% | 0.0% |
| 9% | 1.08% | 0.17% | 24 | Ferrite | 15.7% | 0% | 0.80% |
| 10% | 1.11% | 0.19% | 23.2 | Ferrite | 16.5% | 0% | 1.50% |

Microstructure & Performance

In some embodiments of this disclosure alloys may be fully described by their microstructural features. The microstructure of embodiments of the alloys provides advantageous material properties.

As mentioned, the hardness of embodiments of the disclosed alloys can remain relatively low. Hardness was measured used Vickers hardness, specifically HV0.3. The abrasion resistance was measured using ASTM G65 Procedure A. PTA welding was used to compare the alloy of the disclosure with 431 SS using the following parameters resulting in weld beads about 3 mm thick and 28 mm wide:

Voltage: 28 V
Amperage: 120 A
Powder Feed: 35 g/min
Traverse Rate: 2.1 in/min
Plasma Gas: 6 SCFH
Carrier Gas: 2.5 SCFH
Shielding Gas: 24 SCFH Similar microstructures and coatings of similar performance characteristics can be generated using laser cladding and EHLA.

TABLE 7

Performance Properties of Studied PTA Coatings

| Alloy | Vickers Hardness (HV 0.3) | Volume Loss via ASTM G65 Procedure A |
|---|---|---|
| 1 | 330 | 103 |
| 431 SS | 539 | 252 |

As shown in Table 7, the hardness of alloy of the disclosure is lower than that of 431 SS, yet the abrasion resistance of alloy of the disclosure is higher.

In some embodiments, the hardness of the disclosed alloys is 450 (or about 450) Vickers or lower. In some embodiments, the hardness is 400 (or about 400) Vickers or lower. In some embodiments, the hardness is 350 (or about 350) Vickers or lower. This can include any type of coating, such as a PTA coating. As mentioned, lower hardness can benefit machinability of the coating.

In some embodiments, the alloy can have an ASTM G65 volume loss of 200 (or about 200) mm$^3$ or less. In some embodiments, the alloy can have an ASTM G65 volume loss of 150 (or about 150) mm$^3$ or less. In some embodiments, the alloy can have an ASTM G65 volume loss of 100 (or about 100) mm$^3$ or less. This can include any type of coating, such as a PTA coating.

It is also advantageous for the alloy to be weldable crack free under PTA, laser, and EHLA processes, though the particular process does not limit the disclosure. The alloy of the disclosure alloy has demonstrated the capability to weld a crack free overlay under PTA and laser conditions.

The formation of hard phases such as borides, carbides, borocarbides, oxides, and nitrides can improve the wear resistance of an alloy. There are practical limits to the fraction of hard phases where excessively high values may lead to the alloy cracking after deposition or in service, especially when exposed to cyclical and rapid changes in temperature. Hard phases in this disclosure can be calculated as the sum of all borides, carbides, borocarbides, oxides, and nitrides as measured using quantitative metallography techniques on arc melted samples of the alloys.

Specifically, in some embodiments the alloy may contain amounts of primary carbides in the matrix. In some embodiments, a primary carbide volume fraction of 5 (or about 5)

vol. % can be embedded in a matrix primarily composed of ferrite. In some embodiments, a primary carbide volume fraction of 7.5 (or about 7.5) vol. % can be embedded in a matrix primarily composed of ferrite. In some embodiments, a primary carbide volume fraction of 10 (or about 10) vol. % can be embedded in a matrix primarily composed of ferrite.

In other embodiments, the alloy may contain borides in the microstructure. As shown in FIGS. 6-7, in the alloy of the disclosure the volume fraction of hard phase is measured as the sum of all borides [301] [302] as 23%. In the alloy of the disclosure the volume fraction of hard phases is measured as the borides [401] and carbides [402] as 14%.

In some embodiments of this disclosure, the volume fraction of all hard phases can be between 5 and 35% (or about 5 and about 35%). In some embodiments of this disclosure, the volume fraction of all hard phases can be between 5 and 25% (or about 5 and about 25%). In some embodiments of this disclosure, the volume fraction of all hard phases can be between 7 and 25% (or about 7 and about 25%). In some embodiments of this disclosure, the volume fraction of all hard phases can be between 8 and 15% (or about 8 and about 15%). In some embodiments of this disclosure, the volume fraction of all hard phases can be between 10 and 25% (or about 10 and about 25%).

The PREN of the matrix phase is a strong predictor of corrosion performance of the alloy. PREN is calculated as [Cr+3.3*(Mo+0.5*W)+16*N] where elemental values are in weight percent. Elemental weight percent is measured using energy-dispersive X-ray spectroscopy (EDS) in a scanning electron microscope (SEM).

In alloy of the disclosure the PREN is calculated from the matrix phase [303] measured via EDS as 36.3.

In some applications, the alloys described in this disclosure can be deposited as a coating intended to provide corrosion resistance. Where corrosive media are present, such as high chloride content water, excessive coating porosity may allow corrosive media to penetrate to the substrate. If this penetration occurs, corrosion of the substrate is likely leading to surface discoloration, reduced overlay performance, and/or disbanding of the coating from the substrate. As a result, it can be advantageous to control the percentage of porosity in a coating deposited by thermal spraying or other methods. Porosity is measured via ASTM E2109-01, hereby incorporated by reference in its entirety.

In some embodiments of this disclosure, the coating formed from alloys described can have a porosity less than 3% (or about 3%). In some embodiments of this disclosure, the coating formed from alloys described can have a porosity less than 2% (about 2%). In some embodiments of this disclosure, the coating formed from alloys described can have a porosity less than 1.5% (or about 1.5). In some embodiments of this disclosure, the coating formed from alloys described can have a porosity less than 1% (or about 1%).

In some embodiments there can be 0 vol. % (or about 0 vol. %) FCC austenite present. In some embodiments the maximum volume fraction of FCC austenite is less than 5 vol. % (or less than about 5 vol. %). In some embodiments the maximum volume fraction of FCC austenite is less than 10 vol. % (or less than about 10 vol. %). In some embodiments the maximum volume fraction of FCC austenite is less than 15 vol. % (or less than about 15 vol. %).

In some embodiments the volume fraction of borides can be between 2% and 25% (or about 2% and about 25%). In some embodiments the volume fraction of borides can be between 2% and 10% (or about 2% and about 10%). In some embodiments the volume fraction of borides can be between 2% and 6% (or about 2% and about 6%). In some embodiments the volume fraction of borides can be between 8% and 24% (or about 8% and about 24%). In some embodiments the volume fraction of borides can be between 8% and 16% (or about 8% and about 16%). In some embodiments the volume fraction of borides can be between 10% and 22% (or about 10% and about 22%).

In some embodiments the volume fraction of MC carbides can be between 1% and 15% (or between about 1% and about 15%). In some embodiments the volume fraction of MC carbides can be between 1% and 6% (or between about 1% and about 6%). In some embodiments the volume fraction of MC carbides can be between 5% and 15% (or between about 5% and about 15%). In some embodiments the volume fraction of MC carbides can be between 7% and 12% (or about 7% and about 12%).

In some embodiments, the ferrite phase fraction is 50 (or about 50) vol. % or higher. In some embodiments, the ferrite phase fraction is 60 (or about 60) vol. % or higher. In some embodiments, the ferrite phase fraction is 70 (or about 70) vol. % or higher.

In some embodiments, the alloy matrix can be 100% ferritic. In some embodiments of this disclosure alloy matrix can be greater than 95% ferritic (or greater than about 95%). In some embodiments, the alloy matrix can be greater than 90% ferritic (or greater than about 90%). In some embodiments, the alloy matrix can be greater than 80% ferritic (or greater than about 80%).

In some embodiments, the matrix can include, in weight percent, greater than 13% chromium (or greater than about 13%). In some embodiments, the matrix can include, in weight percent, greater than 15% chromium (or greater than about 15%). In some embodiments, the matrix can include, in weight percent, greater than 17% chromium (or greater than about 17%). In some embodiments, the matrix can include, in weight percent, greater than 18% chromium (or greater than about 18%). In some embodiments, the matrix can include, in weight percent, greater than 20% chromium (or greater than about 20%).

In some embodiments, the alloy can include, in volume percent, less than 25% (or less than about 25%) intermetallic phases. In some embodiments, the alloy can include, in volume percent, less than 20% (or less than about 20%) intermetallic phases. In some embodiments, the alloy can include, in volume percent, less than 15% (or less than about 15%) intermetallic phases. In some embodiments, the alloy can include, in volume percent, less than 10% (or less than about 10%) intermetallic phases. In some embodiments, the alloy can include, in volume percent, less than 8% (or less than about 8%) intermetallic phases.

EXAMPLES

Example 1

The alloy of the disclosure was deposited by the conventional laser cladding process using the parameters in Table 7.

TABLE 8

| | | | | | Deposition | | | |
|---|---|---|---|---|---|---|---|---|
| Alloy | Power | Powder Feed | Distance | Gas | Carrier Gas Flow | Shielding Gas Flow | Travel Speed | Coating Thickness |
| 2 | 2.20 kW | 16.97 g/min | 16 mm | Argon | 5 slpm | 20 slpm | 19 mm/s | 3.0 mm |

The coating that was deposited was then cross sectioned, mounted and polished for EDS chemistry analysis. 5 measurements taken by the EDS on the matrix of the coating were used to determine the average content of Cr and Mo. The average amount of Cr and Mo in the matrix of the coating are included in Table 9.

TABLE 9

| | Coating Averages | |
|---|---|---|
| Alloy | Wt % | Matrix |
| 2 | Cr | 22.02% |
| | Mo | 1.90% |

Lastly, the Microhardness of the coating was measured using a Vickers hardness measurement with 300 gf. The hardness of the alloy was 283 HV300 after taking the average of 10 measurements across the sample.

Example 2

The alloy of the disclosure was deposited by conventional laser cladding process to produce a coating that was approximately 25 mm×75 mm and 3 mm thick. The coating was subjected to ASTM G65A testing, which resulted in a volume loss of 92.3 mm³. Additionally, the coating was cross sectioned, mounted and polished for Microhardness testing. The Microhardness of the coating was done using Vickers Hardness with a force of 300 g. The hardness of the alloy was 270 HV300 after taking advantage of 10 measurements across the sample. In comparison, a coating of 420 stainless steel was deposited by conventional laser cladding. The ASTM G65A abrasion resistance of the coating was 136.9 mm³, while the Microhardness of the coating was measured to be 570 HV300 after an average of ten measurements.

TABLE 10

| Comparative Performance Criteria | | |
| --- | --- | --- |
| Alloy | ASTM G65A | Microhardness |
| 2 | 92.3 mm$^3$ | 270 HV$_{300}$ |
| 420 Stainless | 136.9 mm$^3$ | 570 HV$_{300}$ |

Example 3

The alloys of the disclosure along with 431 stainless steel, a conventional material, was deposited by conventional laser cladding process to produce a coating approximately 3 mm thick. ASTM G65, G77, and Vickers microhardness was conducted.

TABLE 11

| Comparative Performance Criteria | | | |
| --- | --- | --- | --- |
| Alloy | ASTM G65A | ASTM G77 | Microhardness |
| 431 SS | 1539 mg | 1.8 mm$^3$ | 397 HV$_{300}$ |
| 2 | 899 mg | 4.3 mm$^3$ | 266 HV$_{300}$ |
| 3 | 712 mg | 3.2 mm$^3$ | 299 HV$_{300}$ |

Applications

The alloys described in this patent can be used in a variety of applications and industries. Some non-limiting examples of applications of use include:

Surface Mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and teeth and hardfacing for ground engaging tools and teeth, shrouds and adapters, wear plate and rock boxes including for buckets and dumptruck liners, heel blocks and hardfacing for heel blocks on mining shovels, grader blades and hardfacing for grader blades, stacker reclaimers, sizer crushers, jaw crushers, ripper teeth, cutting edges, general wear packages for mining components and other comminution components.

Downstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods, sucker rods and couplings, lift plungers, neyfor rotors, artificial lift casing, and ESP pump housing and impellers, flowlines and subsea flowlines.

Upstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers, through air dryers, and other dryers, calendar rolls, machine rolls, press rolls, winding rolls, digesters, pulp mixers, pulpers, pumps, boilers, shredders, tissue machines, roll and bale handling machines, fiber guidance systems such as deflector blades, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, sugar cane harvesting knives, hammers, troughs, primary fan blades, secondary fan blades, augers, components common to mining applications, and other agricultural applications.

Construction applications include the following components and coatings for the following components: cement chutes, cement piping, bag houses, mixing equipment and other construction applications Machine element applications include the following components and coatings for the following components: Shaft journals, hydraulic cylinders, paper rolls, gear boxes, drive rollers, impellers, rebuilding of engine decks, propeller shafts and other shafts, general reclamation and dimensional restoration applications including the restoration of cast iron and specifically grey cast iron and ductile iron parts and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

Automotive applications include coatings for valves and valve seats, cylinders and other components of the internal combustion engine, brake disks and pads.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding, ultra-high speed lasers cladding (EHLA), and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding.

From the foregoing description, it will be appreciated that inventive ferritic alloys and methods of use are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount. Additionally, all values of tables within the disclosure are understood to either be the stated values or, alternatively, about the stated value.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A cladding feedstock comprising Fe and, in wt. %:
   Cr: 16 to 26;
   Ti: 0.4 to 2.4;
   Mo: 0.8 to 3.6;
   Nb: 4 to 6;
   Nb+Ti+V: 4.4 to 12; and
   C: 0.6 to 1.2;
   wherein the feedstock is characterized by having, under thermodynamic equilibrium conditions, a total ferrite phase mole fraction of 50 mol. % or higher at all temperatures below the solidus and above 500 K.

2. The feedstock of claim 1, wherein the feedstock comprises, in wt. %: Nb+Ti+V: 4.4 to 10.

3. The feedstock of claim 1, wherein the feedstock comprises Fe and, in wt. %:
   Cr: 18 to 25;
   Ti: 0.45 to 2.2;
   Mo: 0.9 to 3.3;
   Nb: 4.5 to 5.5; and
   C: 0.7 to 1.1.

4. The feedstock of claim 1, wherein the feedstock further comprises, in wt. %:
   B: 0.3 to 0.5.

5. The feedstock of claim 1, wherein the total ferrite phase mole fraction is 60 mol. % or higher at all temperatures below the solidus and above 500 K.

6. The feedstock of claim 1, wherein the feedstock is characterized by having, under thermodynamic equilibrium conditions, a primary carbide formation temperature between 1750 K and 2100 K.

7. The feedstock of claim 1, wherein the feedstock is characterized by having, under thermodynamic equilibrium conditions, a total primary carbide mole fraction of 5 mol. % or higher at 1300 K.

8. The feedstock of claim 1, wherein the feedstock is a powder or wherein the feedstock is one or more wires.

9. The feedstock of claim 1, comprising, under thermodynamic equilibrium conditions:

a ferrite matrix comprising at least 12 wt. % Cr; and a mole fraction of hard phases precipitating from liquid greater than 5%.

10. The feedstock of claim 9, wherein the hard phases comprise at least one of carbides and borides.

11. A coating formed from the feedstock of claim 1.

12. The coating of claim 11, comprising:

a ferrite matrix; and a plurality of primary carbides, wherein the primary carbides are embedded in the ferrite matrix.

13. The coating of claim 12, wherein the plurality of primary carbides comprise at least one of Nb, Ti, and V.

14. The coating of claim 12, wherein the plurality of primary carbides comprise an isolated and spherical morphology.

15. The coating of claim 11, wherein the coating has a total primary carbide volume fraction of at least 5 vol. %.

16. The coating of claim 11, wherein the coating has a Cr content of the ferrite matrix of at least 12 wt. %.

17. The coating of claim 11, wherein the coating has a hardness of 450 HV 0.3 or lower.

18. The coating of claim 11, wherein the coating has an ASTM G65 Procedure A volume loss of 200 mm$^3$ or less.

19. The coating of claim 11, wherein the coating is configured to be formed through a deposition process.

20. A method of applying the feedstock of claim 1 as a coating.

* * * * *